(12) United States Patent
Wang et al.

(10) Patent No.: US 12,105,305 B2
(45) Date of Patent: Oct. 1, 2024

(54) HOLOGRAPHIC DISPLAY SYSTEM

(71) Applicant: JINGMEN CITY DREAM EXPLORATION TECHNOLOGY CO., LTD., Jingmen (CN)

(72) Inventors: Guangjun Wang, Jingmen (CN); Weiwei Yu, Jingmen (CN)

(73) Assignee: JINGMEN CITY DREAM EXPLORATION TECHNOLOGY CO., LTD., Jingmen (CN)

( * ) Notice: Subject to any disclaimer, the term of this patent is extended or adjusted under 35 U.S.C. 154(b) by 446 days.

(21) Appl. No.: 17/753,804

(22) PCT Filed: Aug. 21, 2020

(86) PCT No.: PCT/CN2020/110405
§ 371 (c)(1),
(2) Date: Mar. 15, 2022

(87) PCT Pub. No.: WO2021/052104
PCT Pub. Date: Mar. 25, 2021

(65) Prior Publication Data
US 2022/0365363 A1 Nov. 17, 2022

(30) Foreign Application Priority Data
Sep. 17, 2019 (CN) .......................... 201910875975.1
Apr. 17, 2020 (CN) .......................... 202010303254.6
(Continued)

(51) Int. Cl.
*G02B 30/56* (2020.01)
*G02B 30/40* (2020.01)
(Continued)

(52) U.S. Cl.
CPC ............. *G02B 30/56* (2020.01); *G02B 30/40* (2020.01); *H04N 13/383* (2018.05); *G02B 30/54* (2020.01)

(58) Field of Classification Search
CPC ........ G02B 30/56; G02B 30/40; G02B 30/54; G02B 17/02; H04N 13/383; H04N 9/31;
(Continued)

(56) References Cited

U.S. PATENT DOCUMENTS 9,522,326 B2    12/2016  Lin et al.
2010/0067077 A1*  3/2010  Kroll .................... G03H 1/2294
                                                                    359/22
(Continued)

FOREIGN PATENT DOCUMENTS

CN    106772821 A    5/2017
CN    107533184 A    1/2018
(Continued)

OTHER PUBLICATIONS

International Search Report and Written Opinion of International Searching Authority for PCT/CN2020/110405, Isa/CN, Beijing, China, Dated: Oct. 12, 2020.

*Primary Examiner* — Magda Cruz
(74) *Attorney, Agent, or Firm* — M&B IP Analysts, LLC

(57) ABSTRACT

Provided in the present application is a holographic display system, comprising an on-site holographic display system, a transmissive geometric holographic display system, a geometric holographic display system with folded optical path, and a reflective geometric holographic display system. A display element capable of directly displaying screens provided with depth of field information is used to project a diverging 3D image in the air without the aid of another reference light source. The image is converted by a projection screen of an equivalent negative refractive index flat lens to then obtain an observable 3D image suspended in the
(Continued)

air, which reduces costs. At the same time, the 3D image may be displayed in front of or behind the projection screen, the display space is infinite, and in a very small device space, a super large screen and super deep depth of field may also be displayed.

20 Claims, 12 Drawing Sheets

(30) Foreign Application Priority Data

Apr. 17, 2020 (CN) .......................... 202010303403.9
Apr. 17, 2020 (CN) .......................... 202010303406.2

(51) Int. Cl.
*G02B 30/54* (2020.01)
*H04N 13/383* (2018.01)

(58) Field of Classification Search
CPC .... H04N 13/363; H04N 13/128; G03B 35/18; G03H 1/12
See application file for complete search history.

(56) References Cited

U.S. PATENT DOCUMENTS

2016/0266543 A1* 9/2016 Crowder ................. G02B 30/56
2021/0157413 A1* 5/2021 Miller .................. H04N 13/388

FOREIGN PATENT DOCUMENTS

| CN | 106773469 | B | 11/2018 |
| CN | 110471249 | A | 11/2019 |
| CN | 111338175 | A | 6/2020 |
| CN | 111338176 | A | 6/2020 |
| CN | 111338177 | A | 6/2020 |
| JP | 2006053321 | A | 2/2006 |

\* cited by examiner

HOLOGRAPHIC DISPLAY SYSTEM

CROSS REFERENCE TO RELATED APPLICATION(S)

This application is a continuation of International Application No. PCT/CN2020/110405, filed on Aug. 21, 2020, now pending, which the contents are hereby incorporated by reference. The International application PCT/CN2020/110405 claims the benefit of the following applications:

Chinese Application No. 201910875975.1, filed with the China National Intellectual Property Administration (CNIPA) on Sep. 17, 2019, and entitled "ON-SITE HOLOGRAPHIC DISPLAY SYSTEM", which is incorporated herein by reference in its entirety.

Chinese Application No. 202010303254.6, filed with the China National Intellectual Property Administration (CNIPA) on Apr. 17, 2020, and entitled "TRANSMISSIVE GEOMETRICAL HOLOGRAPHIC DISPLAY SYSTEM", which is incorporated herein by reference in its entirety.

Chinese Application No. 202010303403.9, filed with the China National Intellectual Property Administration (CNIPA) on Apr. 17, 2020, and entitled "GEOMETRICAL HOLOGRAPHIC DISPLAY SYSTEM WITH FOLDED OPTICAL PATH", which is incorporated herein by reference in its entirety.

Chinese Application No. 202010303406.2, filed with the China National Intellectual Property Administration (CNIPA) on Apr. 17, 2020, and entitled "REFLECTIVE GEOMETRICAL HOLOGRAPHIC DISPLAY SYSTEM", which is incorporated herein by reference in its entirety.

TECHNICAL FIELD

The present disclosure relates to the 3D display field, and in particular, to a holographic display system.

BACKGROUND ART

A 3D display technology can provide depth information to show a more realistic display scene. Currently, mainstream 3D display solutions (such as 3D movies in theaters) include pseudo-3D display images based on anaglyph image pairs, but cannot display real 3D images. Although many 3D display technologies have been proposed, none of the technologies can truly display large-scale high-quality 3D images stably. Holographic display is considered to be an ultimate solution in the display field. However, due to extremely demanding requirements of the holographic display on equipment and an environment, it is difficult to achieve commercial application in a short term.

A patent with the authorization announcement No. CN106773469B provides a brand new on-site reproduction holographic solution. In order that a human eye may observe a stable 3D image displayed with a large scale and a high quality, parallel light, a projection area of which is the same as an area of a projection screen, should be used as a reference light source when an optical path of the solution is arranged (when the reference light source is non-parallel light, a 3D image observed by the human eye is distorted). An optical path layout of the solution is relatively demanding and difficult to implement.

A patent with the application No. CN107831558A provides a plane lens with an equivalent negative refractive index and designs an air projection. However, a large-area flat display device needs to be used, and display can only be implemented in front of a screen. This solution adopts a very bulky device, and has a limited display space and a fixed display location, which causes a limited viewing angle such that an image cannot be observed if the viewing angle is offset by a certain angle. Further, it is very difficult to achieve a real 3D display, and it can only achieve an effect similar to Pepper's ghost.

SUMMARY

In view of this, the present disclosure provides a holographic display system. According to the system, display can be implemented in front of or behind a screen, a display space is infinite, a viewing angle is flexible, and an ultra-large picture and an ultra-deep depth of field can be displayed in an extremely small device space, thereby achieving low-cost high-quality 3D image display.

To achieve the above objective, the present disclosure provides the following technical solutions.

An on-site holographic display system includes a holographic projector (1), a projection screen (2), an interactive response unit (3), and a processor (4).

Locations of the holographic projector (1) and the projection screen (2) correspond to each other. The holographic projector (1) is configured to project a 3D image with depth information in space.

The projection screen (2) is a screen forming a conjugate image point by converging an image point on one side of the projection screen (2) to another side of the projection screen (2), and is configured to convert the 3D image with depth information projected by the holographic projector (1) into a conjugate location of the 3D image.

The holographic projector (1) and/or the projection screen (2) is provided with a motion actuator (5) connected to the processor (4). The motion actuator (5) is configured to control relative movement and/or overall movement between the holographic projector (1) and the projection screen (2).

A lens diameter of the holographic projector (1) is D. A maximum horizontal length of the projection screen (2) is L. A weight of the holographic projector (1) is W. D, L, and W satisfy:

$$0 < \frac{D}{L \cdot W} \leq 20.$$

The interactive response unit (3) includes a human eye tracking unit (31) and an interactive motion capturing unit (32) or includes only an interactive motion capturing unit (32). The human eye tracking unit (31) is configured to track a location of a human eye (E) and send positioning information of the human eye (E) to the processor (4). The interactive motion capturing unit (32) is configured to identify a user interactive motion and send information about the user interactive motion to the processor (4). The processor (4) controls the system to respond accordingly based on the positioning information of the human eye (E) and/or the information about the user interactive motion.

The processor (4) is electrically connected to the holographic projector (1), the interactive response unit (3), and the motion actuator (5) separately. The processor (4) sends projection data information to the holographic projector (1), to control a projection picture and a picture depth of the holographic projector (1).

A transmissive geometrical holographic display system includes a display element (6), a transmissive geometrical holographic screen (7), support structure (8), and a controller (9).

The display element (6) is configured to project picture information in space.

The transmissive geometrical holographic screen (7) is a screen forming a conjugate image point by converging an image point on one side of the transmissive geometrical holographic screen (7) to another side of the transmissive geometrical holographic screen (7). A location of the transmissive geometrical holographic screen (7) corresponds to the display element (6). The transmissive geometrical holographic screen (7) is configured to convert an image projected by the display element (6) to an optical conjugate location relative to the transmissive geometrical holographic screen (7).

The support structure (8) is matched with the display element (6) and the transmissive geometrical holographic screen (7) separately, and provides physical structural support for the display element (6) and the transmissive geometrical holographic screen (7).

The controller (9) is electrically connected to the display element (6). The display element (6) includes at least one ordinary projection device capable of projecting a two-dimensional picture. The quantity of viewpoints of the transmissive geometrical holographic display system is n. An average diameter of transparent parts of an outermost lens of the ordinary projection device included in the display element (6) is D decimeters. An average power of projection light sources of the ordinary projection device included in the display element (6) is P watts. n, D, and P satisfy:

$$n^{1.27} \cdot P \cdot \left(1 - \frac{D}{27}\right) \leq 630.$$

A geometrical holographic display system with folded optical path includes at least one projector (6), a transmissive geometrical holographic screen (7), a support structure (8), and a controller (9).

The at least one projector (6) is configured to project picture information in space.

The transmissive geometrical holographic screen (7) is a screen forming a conjugate image point by converging an image point on one side of the transmissive geometrical holographic screen (7) to another side of the transmissive geometrical holographic screen (7).

The support structure (8) is matched with the projector (6) and the transmissive geometrical holographic screen (7) separately, and provides physical structural support for the projector (6) and the transmissive geometrical holographic screen (7).

The controller (9) is electrically connected to the projector (6).

The geometrical holographic display system with folded optical path further includes at least one optical path folding mirror group (10) disposed on one side or both sides of the transmissive geometrical holographic screen (7) and connected to the support structure (8) separately. The optical path folding mirror group (10) includes at least one plane mirror with reflection function, and is configured to change a propagation path of light projected by the projector (6).

The quantity of viewpoints of the geometrical holographic display system with folded optical path is n. An average diameter of transparent parts of an outermost lens of the projector (6) is D decimeters. An average power of projection light sources of the projector (6) is P watts. n, D, and P satisfy:

$$n^{1.27} \cdot P \cdot \left(1 - \frac{D}{27}\right) \leq 630.$$

A reflective geometrical holographic display system includes at least one projector (6), an auxiliary imaging screen (7), one or two reflective geometrical holographic screens (11), a support structure (8), and a controller (9).

The at least one projector (6) is configured to project picture information in space.

The auxiliary imaging screen (7) is for light splitting.

One reflective geometrical holographic screen (11) is located on one side of the auxiliary imaging screen (7), or two reflective geometrical holographic screens (11) are respectively located on both sides of the auxiliary imaging screen (7).

The support structure (8) is matched with the projector (6), the auxiliary imaging screen (7), and the reflective geometrical holographic screen (11) separately, and provides physical structural support for the projector (6), the auxiliary imaging screen (7), and the reflective geometrical holographic screen (11).

The controller (9) is electrically connected to the projector (6).

The quantity of viewpoints of the reflective geometrical holographic display system is n. An average diameter of transparent parts of an outermost lens of the projector (6) is D decimeters. An average power of projection light sources of the projector (6) is P watts. n, D, and P satisfy:

$$n^{1.27} \cdot P \cdot \left(1 - \frac{D}{27}\right) \leq 630.$$

Compared with the prior art, the present disclosure has the following advantages:

1. A display element capable of directly displaying a picture with depth-of-field information is adopted to project a divergent 3D image in the air. Without the aid of another reference light source, the divergent 3D is converted using a projection screen of a plane lens with an equivalent negative refractive index, then a 3D image suspended in the air that can be observed is obtained, which reduces costs. Meanwhile, the 3D image can be displayed in front of or behind the projection screen and a display space is infinite. Moreover, an ultra-large picture and an ultra-deep depth of field can be displayed in an extremely small device space.
2. Compared with Pepper's ghost in which a display area of a screen is less than 80% due to an influence of a visual angle, the system of the present disclosure can display the picture on the entire screen. This is truly borderless and blends perfectly with an environment.
3. The processor controls a projection picture and a depth of field of the display element displaying the picture with the depth-of-field information. Since a depth of focus is adjustable, it can avoid visual fatigue caused by user's long time watching a picture with a specific depth of focus. thereby reducing an occurrence of myopia and improving user's vision.

4. The human eye tracking unit can identify the location of the human eye. Then, the relative location of the holographic projector and the screen is adjusted in real time by controlling the motion actuator, so that the human eye and the holographic projector are always symmetrical (optically conjugated to each other) relative to the projection screen. It is ensured that the 3D image can be accurately observed by the user. A purpose of free viewing angle is achieved.

BRIEF DESCRIPTION OF THE DRAWINGS

To describe the technical solutions in the embodiments of the present disclosure or in the prior art more clearly, accompanying drawings used in the embodiments or the prior art are described below. Apparently, the described accompanying drawings merely show the embodiments of the present disclosure, and those of ordinary skill in the art may still derive other drawings from the provided accompanying drawings without creative efforts.

DETAILED DESCRIPTION OF THE EMBODIMENTS

Figure 1:
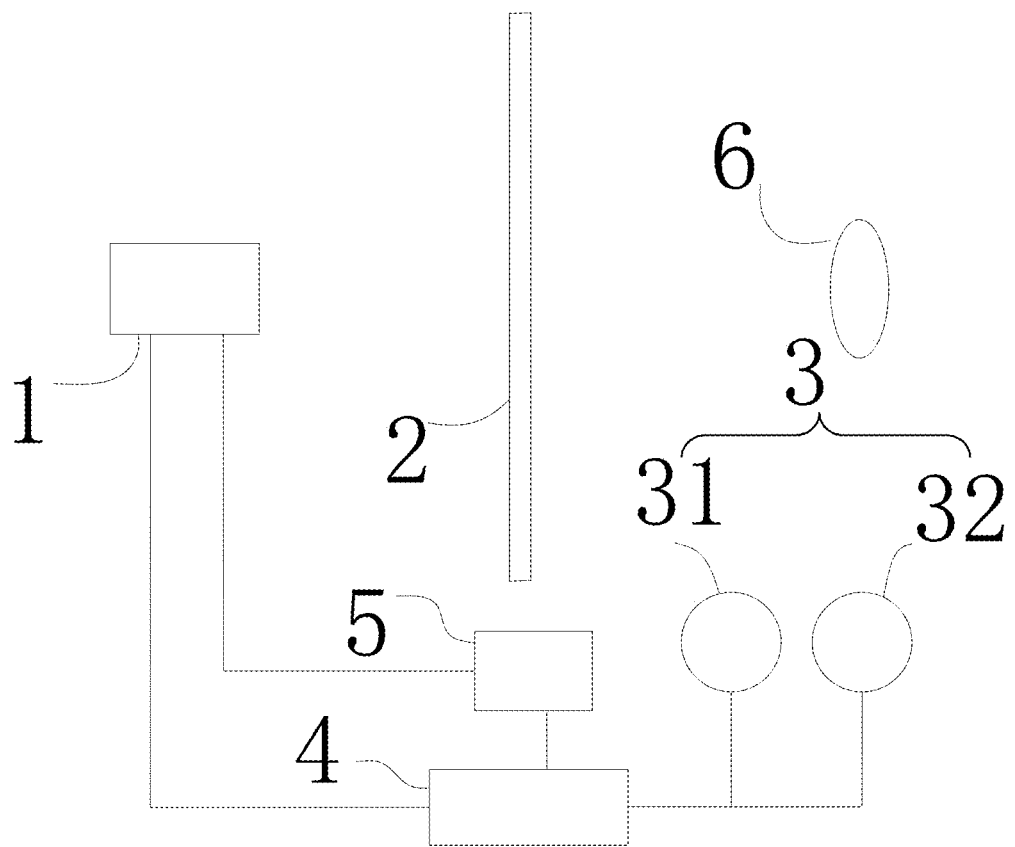
FIG. 1 is a system diagram according to Embodiment I of the present disclosure.

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In order to enable those skilled in the art to better understand the technical solution of the present disclosure, the present disclosure will be described in detail below with reference to accompanying drawings. The description in this section is merely exemplary and explanatory and should not have any limitation on the protection scope of the present disclosure.

It should be noted that similar reference signs and letters represent similar items in the accompanying drawings below. Therefore, once an item is defined in one drawing, it does not need to be further defined and described in subsequent drawings.

It should be noted that orientation or position relationships indicated by terms "center", "top", "bottom", "left", "right", "vertical", "horizontal", "inside", "outside", and the like are orientation or position relationships shown in the accompanying drawings, or the usual orientation or position relationships of the products of the present disclosure when in use. These terms are only used to facilitate description of the present disclosure and simplify the description, but not to indicate or imply that the mentioned apparatus or components must have a specific orientation or must be established and operated in a specific orientation, and thus these terms cannot be understood as a limitation to the present disclosure. In addition, the terms such as "first", "second", and "third" are used only for the purpose of description and cannot be understood to indicate or imply relative importance.

Moreover, terms such as "horizontal", "vertical", and "overhanging" do not mean that a component is absolutely horizontal or overhanging, but that it can be tilted slightly. For example, "horizontal" only means that a direction of the component is more horizontal than "vertical", and it does not mean that the structure must be completely horizontal, but can be tilted slightly.

In the description of the present disclosure, it should be noted that, unless otherwise clearly specified and limited, meanings of terms "dispose", "install", "connected with", and "connected to" should be understood in a board sense. For example, the connection may be a fixed connection, a removable connection, or an integral connection, may be a mechanical connection or an electrical connection, may be a direct connection or an indirect connection by using an intermediate medium, or may be intercommunication between two components. Those of ordinary skill in the art may understand the specific meanings of the above terms in the present disclosure based on the specific situation.

Embodiment I

Figure 2:
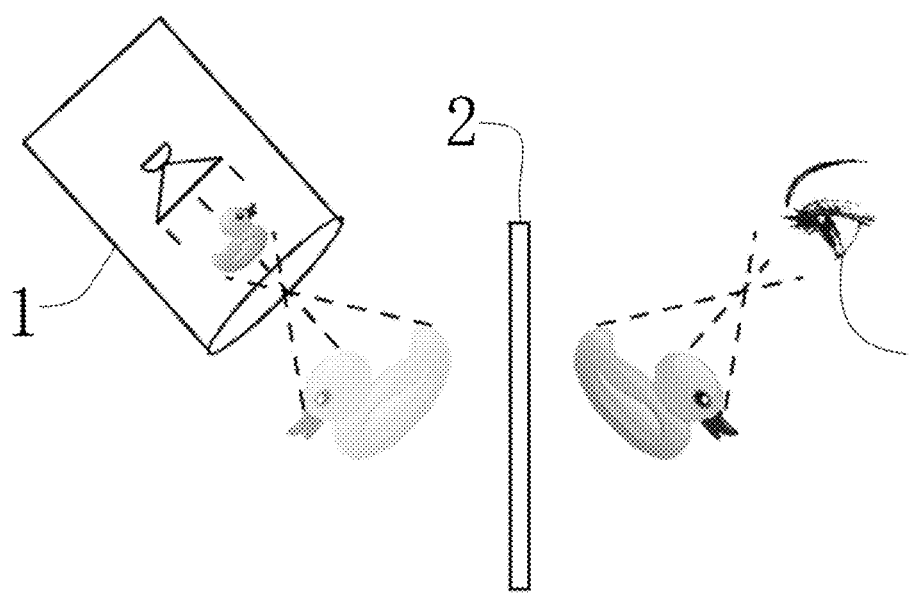
FIG. 2 is a schematic diagram according to Embodiment I of the present disclosure.

Refer to FIG. 1 and FIG. 2, the present disclosure provides the following technical solution.

An on-site holographic display system includes a holographic projector 1, a projection screen 2, an interactive response unit 3, and a processor 4.

The holographic projector 1 is located on one side of the projection screen 2. The holographic projector 1 is configured to project a 3D image with depth information in space. It is preferable to use two holographic projectors 1 to realize a binocular display mode. At this time, a lens of the single holographic projector 1 is only required to cover one eye of a user, so a lens diameter (transparent part) of the single holographic projector 1 suitable for the binocular display mode does not need to be too large. Alternatively, only one holographic projector 1 with a larger lens diameter (transparent part) D may be selected to realize one holographic projector 1 and covers both eyes of the user simultaneously.

The projection screen 2 is a screen forming a conjugate image point by converging an image point on one side of the projection screen to another side of the projection screen. A plane lens with an equivalent negative refractive index is preferred, and has a function of forming the conjugate image point by converging an image point on one side of the projection screen 2 to another side of the projection screen 2. The projection screen 2 is configured to convert the 3D image with depth information projected by the holographic projector 1 to a conjugate location of the projection screen 2 for the user to observe.

The holographic projector 1 is provided with a motion actuator 5 connected to the processor 4. The motion actuator 5 is configured to control relative movement and/or overall movement between the holographic projector 1 and the projection screen 2, to adjust a spatial location between the holographic projector 1 and the projection screen 2. There are various specific implementations of the motion actuator 5. General staff in the industry can design a mechanical structure according to the working principle of the present disclosure to realize the motion actuator 5.

The interactive response unit 3 is disposed above the projection screen 2. The interactive response unit 3 includes a human eye tracking unit 31 and an interactive motion capturing unit 32. The human eye tracking unit 31 is configured to track a location of a human eye E and send positioning information of the human eye E to the processor 4. The human eye tracking unit 3 includes a camera and an infrared distance detector. The camera is configured to identify a human face and position the location of the human eye E based on an image recognition technology. The infrared distance detector detects a distance between the human eye E and the projection screen 2.

The interactive motion capturing unit 32 is configured to identify a user interactive motion and send information about the user interactive motion to the processor 4. An infrared camera may be used as the interactive motion capturing unit 32 to capture the user interactive motion. The processor 4 controls the system to respond accordingly based on the positioning information of the human eye E or the information about the user interactive motion. For example, the processor 4 controls a picture to pan based on a panning gesture signal, or controls a picture to magnify, zoom in, zoom out, touch, or the like based on another corresponding interactive motion.

The processor 4 is electrically connected to the holographic projector 1, the interactive response unit 3, and the motion actuator 5 separately, and is configured to control work of each part. Specifically, the processor 4 sends projection data information to the holographic projector 1 to control a projection picture and a picture depth of the holographic projector 1. Further, the processor 4 controls the motion actuator 5 to adjust spatial locations of the holographic projector 1 and the projection screen 2 based on the received positioning information of the human eye E and information about the user interactive motion obtained by the interactive response unit 3. Therefore, the user may watch a 3D picture normally. It should be noted that a control program of the processor 4 adopted in the present disclosure is a common prior art.

The processor 4 controls the projection picture and a depth of field of the holographic projector 1. Since a depth of focus is adjustable, it can avoid visual fatigue caused by user's long time watching a picture with a specific depth of focus, thereby reducing an occurrence of myopia and improving vision.

The present disclosure may be used for fixed display, such as office, home theater, and vehicle-mounted display, and may also be used for fields of small mobile display, head-mounted display, and the like.

The holographic projector 1 has a lens diameter (transparent part) D (in millimeters), and a weight (excluding a mass of an auxiliary component such as a wire harness) W (in grams). A maximum horizontal length of the projection screen 2 is L (in centimeters) and during an actual application, the following should be met:

$$0 < \frac{D}{L \cdot W} \leq 20.$$

The weight W of the holographic projector 1 has a prominent influence on display stability of the system. If the weight W is too small, a natural vibration frequency of the holographic projector 1 may be relatively high. Environmental vibration (such as construction), user body movement, air convection (such as fans and air-conditioning airflow), or the like may cause the holographic projector 1 to vibrate and resonate. As a result, it is easy to generate noise or be disturbed by external noise, resulting in picture shaking to affect a quality of the picture and make it impossible for the user to receive a stable picture. In a case that the holographic projector 1 is only provided with the motion actuator 5 connected to the processor 4, if the weight W of the holographic projector 1 is too large, it is difficult for image tracking when adjusting a relative location of the holographic projector 1 and the projection screen 2 and the motion actuator 5 used to adjust a location of the holographic projector 1 has relatively high requirements on load-bearing, strength, and the like, which increases costs accordingly.

Influences of the lens diameter (transparent part) D of the holographic projector 1 and the maximum horizontal length L of the projection screen 2 on the system are mainly reflected in a quality and a visual effect of a displayed picture.

When D is too small, a projection picture may leave a visible window with a user's slight movement, easily resulting in the projection picture to be difficult to track. A larger D indicates a larger solid angle coverage of an image output by the holographic projector 1. However, when D is too large, on the one hand, a power consumption of a light source increases, easily resulting in generated heat of the device to be increased, and reducing life and reliability; on the other hand, it may cause too much luminous flux, resulting in a risk of damaging vision.

A corresponding visual angle may increase with increasing of the maximum horizontal length L of the projection screen 2. If the maximum horizontal length L of the projection screen 2 is too large, it may cause difficulty in tracking, easily resulting in picture losing. Further, if a movement sweeping range is too large, it is easy to affect a user's activities, and even cause a danger. If the maximum horizontal length L of the projection screen 2 is too small, a displayed picture is too small to create immersive experience.

In summary, in order to ensure that high quality pictures may be displayed in different application scenarios (such as a desktop application, a shopping mall display application, a cinema application, and a head-mounted application) without affecting a range of user's activities, it is necessary to satisfy:

$$0 < \frac{D}{L \cdot W} \leq 20.$$

The present disclosure is further described below with reference to following embodiments.

(1) Fixed Display

For a fixed display application, the weight W of the holographic projector 1 ranges from 200 g to 3000 g. Considering the above-mentioned disadvantages in a case that W is too large or too small, the weight W of the holographic projector 1 (excluding a mass of an auxiliary component such as a wire harness) is preferably 500 g when the following examples are used for description. The lens diameter (transparent part) D of the holographic projector 1 ranges from 5 mm to 80 mm. The maximum horizontal length L of the projection screen 2 ranges from 15 cm to 150 cm. The details are shown in the following table.

| Example | D/ mm | L/ cm | w/ g | D/ (L * W) | Effect |
|---|---|---|---|---|---|
| Example 1 | 5 | 15 | 500 | 0.0007 | Medium, a display window is relatively small, and visual immersion is not strong |
| Example 2 | 5 | 80 | 500 | 0.0001 | Medium, a displayed picture is normal, but it is difficult to track the picture |
| Example 3 | 5 | 150 | 500 | 0.0001 | Medium, it is difficult to track a displayed picture, and a tracking effect is extremely poor |
| Example 4 | 40 | 15 | 500 | 0.0053 | Medium, a displayed picture is normal, but a phenomenon of overflowing light occurs outside the picture |
| Example 5 | 40 | 80 | 500 | 0.0010 | Excellent, an area of a displayed picture is normal, an effect is good, and it is easy to track |
| Example 6 | 40 | 150 | 500 | 0.0005 | Medium, an area of a displayed picture is normal, an effect is good, but it is difficult to track |
| Example 7 | 80 | 15 | 500 | 0.0107 | Poor, it is difficult to track a picture, an excessive luminous flux may damage a user's vision, and a phenomenon of overflowing light outside the picture interferes with sight |
| Example 8 | 80 | 80 | 500 | 0.0020 | Poor, an effect of a displayed picture is relatively good, but an excessive luminous flux may damage a user's vision, and a phenomenon of overflowing light outside the picture cannot be avoided |
| Example 9 | 80 | 150 | 500 | 0.0011 | Medium, a display window is large, and there is no trailing feeling for a tracking response |

Example 5 is a best example of a fixed display application. For further illustrating the influence of the weight W of the holographic projector 1 on the system, the weight W of the holographic projector 1 is used as a variable according to the example 5.

| Example | D/ mm | L/ cm | w/ g | D/ (L * W) | Effect |
|---|---|---|---|---|---|
| Example 5 | 40 | 80 | 500 | 0.0053 | Excellent, an area of a displayed picture is normal, an effect is good, and it is easy to track |
| Example 10 | 40 | 80 | 100 | 0.0025 | Medium, an effect of a displayed picture is good, but a natural vibration frequency of the projector is relatively high, and the |

-continued

| Example | D/ mm | L/ cm | w/ g | D/ (L * W) | Effect |
|---|---|---|---|---|---|
| | | | | | picture is prone to seriously shaking |
| Example 11 | 40 | 80 | 3000 | 0.0001 | Medium, an effect of a displayed picture is good, but stability of the motion actuator corresponding to the holographic projector is poor |

Example 10 and example 11 further illustrate that for the fixed display application, the weight W of the holographic projector 1 only affects the stability of the system.

(2) Wearable Display

For a head-mounted display application, a relative location of the user's eye E and the system is fixed, so the human eye tracking unit 31 can be canceled.

During practical application, if the weight W of the holographic projector 1 is relatively large, it may cause inconvenience to wear. Therefore, the holographic projector 1 adopts a micro model, the weight W is relatively small, and a normal W ranges from 5 g to 15 g. When the following examples are used for description, the weight W of the holographic projector 1 is preferably 10 g. The lens diameter (transparent part) D of the holographic projector 1 ranges from 1 mm to 15 mm. The maximum horizontal length L of the projection screen 2 ranges from 0.8 cm to 5 cm. The details are shown in the following table.

| Example | D/ mm | L/ cm | w/ g | D/ (L * W) | Effect |
|---|---|---|---|---|---|
| Example 12 | 1 | 0.8 | 10 | 0.125 | Poor, a pupil coverage is poor, and a display window is relatively small |
| Example 13 | 1 | 3 | 10 | 0.033 | Poor, a pupil coverage is poor, and it is easy to lose a picture |
| Example 14 | 1 | 5 | 10 | 0.020 | Poor, a pupil coverage is poor, and it is easy to lose a picture |
| Example 15 | 8 | 0.8 | 10 | 1.000 | Medium, a displayed picture is normal |
| Example 16 | 8 | 3 | 10 | 0.267 | Excellent, an area of a displayed picture is normal, and an effect is good |
| Example 17 | 8 | 5 | 10 | 0.160 | Medium, an effect of a displayed picture is relatively good, but it is easy to lose the picture |
| Example 18 | 15 | 0.8 | 10 | 1.875 | Poor, it is bulky and inconvenient to wear, and an excessive luminous flux may damage vision |
| Example 19 | 15 | 3 | 10 | 0.500 | Poor, it is bulky and inconvenient to wear, an effect of a displayed picture is relatively good, but an excessive luminous flux may damage a user's vision |
| Example 20 | 15 | 5 | 10 | 0.300 | Poor, it is bulky and inconvenient to wear, and it is easy to lose a picture |

Example 16 is a best example of the wearable display.

Based on data in the above examples, the lens diameter (transparent part) D of the holographic projector 1 is set as the maximum value of 80 mm for the fixed display application, and the weight (excluding a mass of an auxiliary component such as a wire harness) W is set as the minimum value of 5 g for the wearable display application, the maximum horizontal length L of the projection screen 2 is set as the minimum value of 0.8 cm for the wearable display application, so that $$\frac{D}{L \cdot W} = 20$$

can be obtained. Therefore, $$\frac{D}{L \cdot W} \leq 20$$

is taken when a range of $$\frac{D}{L \cdot W}$$

is limited.

The examples also show that in a range of $$0 < \frac{D}{L \cdot W} \leq 20,$$

the system according to the present disclosure can achieve the holographic display effect. However, only when the lens diameter (transparent part) D and the weight W of the holographic projector 1, and the maximum horizontal length L of the projection screen 2 are all optimal, a good display effect can be achieved, thereby meeting the user's requirement.

In order to display a color picture, projection light of the holographic projector 1 may include three primary color light sources of red, blue, and green.

During a practical application of the present disclosure, the projection screen 2 may alternatively be a screen of a plane lens with an equivalent negative refractive index. The interactive response unit 3 is configured to position the location of the human eye E and capture the user interactive motion. Therefore, the interactive response unit 3 may be located below the projection screen 2, or at another location, as long as the location of the human eye E can be accurately positioned and the information about the user interactive motion can be accurately captured. The motion actuator 5 is configured to adjust the spatial location between the holographic projector 1 and the projection screen 2. Therefore, the motion actuator 5 is disposed on the holographic projector 1, or is disposed on the projection screen 2, or is disposed on each of the holographic projector 1 and the projection screen 2, for adjusting the relative location of the holographic projector 1 and the projection screen 2. Therefore, the locations of the human eye E and the projector can be optically conjugated. Alternatively, the motion actuator 5 is configured to adjust the overall movement of the holographic projector 1 and the projection screen 2, so that the holographic projector 1 and the projection screen 2 can be moved as a whole when the user moves during a viewing process. Alternatively, when adjusting the locations of the holographic projector 1 and the projection screen 2 as a whole, the motion actuator 5 may simultaneously fine-tune a relative location between the holographic projector 1 and the projection screen 2, so that an optical conjugation region of the projector can always cover the human eye, thereby tracking the location of the user's eye in real time. such that the user can always watch the picture normally.

Principle: The projection screen 2 used in the present disclosure is a plane lens with a negative refractive index that can form a conjugate image point by converging an image point on one side of the projection screen 2 to another side of the projection screen 2. Therefore, if a divergent 3D image may be projected in the air, a visible 3D image suspended in the air that can be observed and obtained via a conversation of the projection screen 2 of the plane lens with a negative refractive index without the aid of another reference light source.

However, since the projection screen 2 of the plane lens with a negative refractive index may only convert the projected 3D image to its (relative to the plane lens with the negative refractive index) optical conjugate location (or a symmetrical location), once the user moves, such as moving left, right, back and forth, the 3D image cannot be accurately observed by the user. The human eye tracking unit 31 may identify the location of the human eye E, and then adjust the location of the holographic projector 1 or the projection screen 2 in real time, so that the human eye E and the holographic projector 1 are symmetrical (mutual optical conjugation) with respect to the projection screen 2. Therefore, it can ensure that the user can always observe the picture. The projection screen 2 only images an image on one side at its symmetrical location on another side of the projection screen 2, which is similar to a principle of Pepper's ghost. Therefore, another assistant technology is required to achieve 3D imaging. The present disclosure uses the holographic projector 1 to project the 3D image. Then, through the projection screen 2, the 3D image is converted to its symmetrical location for observation.

In the display system according to Embodiment I of the present disclosure, the holographic projector 1 projects the divergent 3D image in the air, and the 3D image suspended in the air that can be observed can be obtained by converting the divergent 3D using the projection screen 2 of a plane lens with an equivalent negative refractive index, without the aid of another reference light source. This reduces costs. Compared with Pepper's ghost, in which a display area of a screen is less than 80% due to an influence of a visual angle, the system of the present disclosure, can display the picture on the entire screen. This is truly borderless and blends perfectly with an environment. The 3D image can be further displayed in front of or behind the projection screen. Therefore, a display space is infinite. Moreover, an ultra-large picture and an ultra-deep depth of field can be displayed in an extremely small device space.

Embodiment II

Figure 3:
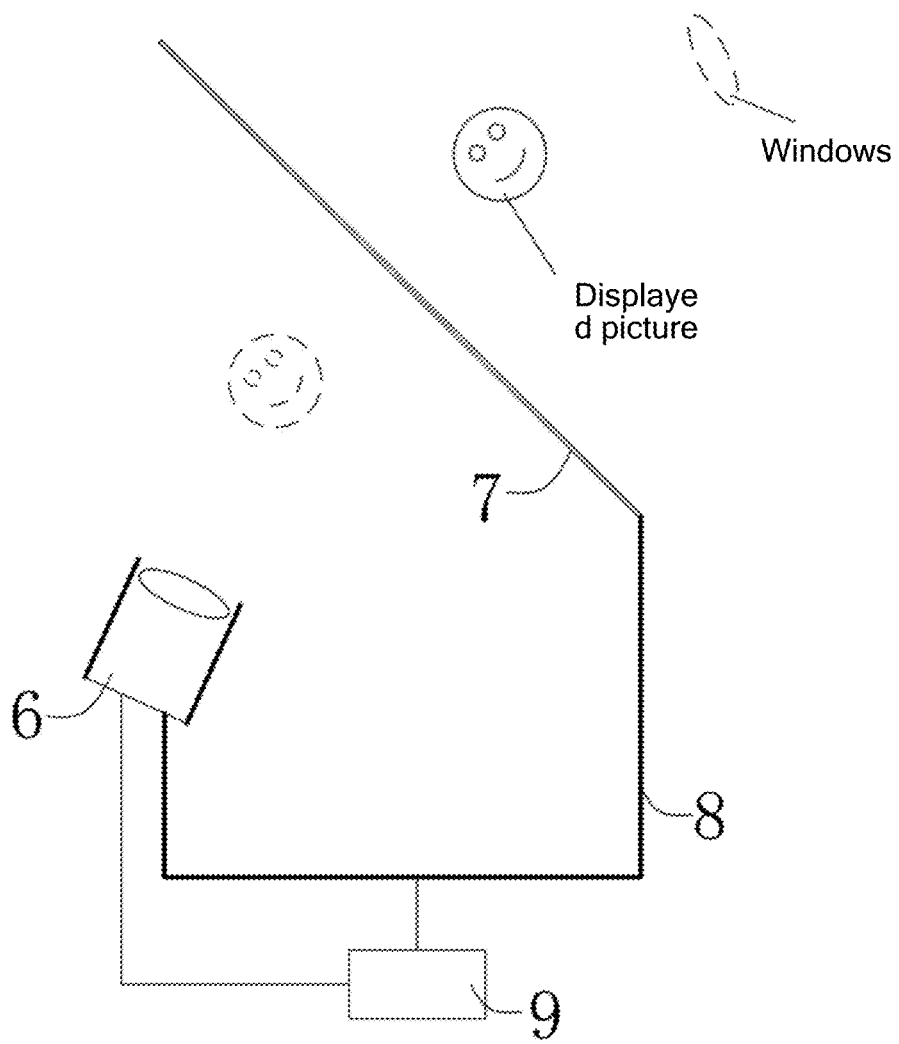
FIG. 3 is a schematic diagram of a transmissive geometrical holographic display system according to Embodiment II of the present disclosure.

As shown in FIG. 3, the present disclosure provides a transmissive geometrical holographic display system, including a display element 6, a transmissive geometrical holographic screen 7, a support structure 8, and a controller 9.

Usually, a 3D film source in a cinema is in a form of a stereo image pair, and shows a 3D effect through binocular parallax. However, an actual depth of focus of a picture is fixed at a location, resulting in visual fatigue. The display element 6 in the system of the present disclosure is configured to project picture information in space. A holographic projector may be directly used as the display element 6, to project a 3D picture in space or a series of groups of two-dimensional pictures distributed in different depths of field in space. The above-mentioned holographic projector may be alternatively replaced by a projection device capable of implementing three-dimensional picture display. For example, an optical design may be further carried out on an ordinary projection device, so that the ordinary projection device can realize 3D display on the basis of adopting a single projector. As disclosed in an all-solid-state holographic projector with the application No. 202010029144.5, a technical solution for displaying a 3D picture is implemented by an optical design of some optical elements added inside the projector. This is not specifically limited herein.

In other embodiments of the present disclosure, an ordinary projection device capable of projecting a two-dimensional picture may alternatively be used as the display element 6, so that the two-dimensional picture can be projected on a focal plane in space. Then, the controller 9 adjusts a depth of field and content of the two-dimensional picture, and presents the content of the picture. Simultaneously, a real sense of distance between the picture and a user can be also shown. Therefore, an effect of projecting a picture with depth information in space is realized. During an actual operation, adjustment of the depth of focus may be real-time, or may be performed once at an interval.

Since a projection and the depth of focus are adjustable, an equivalent depth of focus of the picture may be moved to a reasonable location. This avoids a problem that a 3D depth of focus (an effect of depth of focus caused by binocular parallax) is different from an actual depth of focus, so as to show a more realistic 3D effect. Compared with the holographic projector as the display element 6, this method can effectively reduce costs. Specifically, the above-mentioned ordinary projection device may use a common ordinary projector or a simple modification thereof.

The transmissive geometrical holographic screen 7 is a screen forming a conjugate image point by converging an image point on one side of the transmissive geometrical holographic screen 7 to another side of the transmissive geometrical holographic screen 7. A location of the transmissive geometrical holographic screen 7 corresponds to the display element 6. The transmissive geometrical holographic screen 7 is configured to convert an image projected by the display element 6 to an optical conjugate location relative to the transmissive geometrical holographic screen 7. Preferably, a flexible holographic screen is used, so that the screen may be made into a scrolling screen or a folding screen. This makes the system as a whole more compact and portable. Of course, a rigid screen may also be used for an appropriate occasion.

When it needs to be compatible with displaying a 2D picture, the transmissive geometrical holographic screen 7 may be replaced by an ordinary projection screen, such as an ordinary rear projection screen.

The support structure 8 is matched with the display element 6 and the transmissive geometrical holographic screen 7 separately, and provides physical structural support for the display element 6 and the transmissive geometrical holographic screen 7. Specifically, the support structure 8 may be made into a support frame with a fixed structure. At this time, the display system of the present disclosure is fixed as a whole, and the user needs to be in a specific location to observe the picture.

The controller 9 is electrically connected with the display element 6. The display element 6 may adjust a depth of field and display content of a projection picture based on a control signal of the controller 9.

In order to increase flexibility of the display system, the support structure 8 may also be set as a movable or deformable structure. The support structure 8 and the controller 9 are electrically connected. The support structure 8 makes a corresponding response motion based on control information of the controller 9, so as to achieve relative movement and/or overall movement of the display element 6 and the transmissive geometrical holographic screen 7. In this way, a visual window of the system always covers the user's eye, so that the user can normally watch the picture in different directions. It should be noted that the support structure 8 is based on a general prior art, and may be designed by those skilled in the art based on a space condition of a practical application, e.g., using some hinge structures and structures similar to umbrella shafts, it is very easy to design the deformable structure. This is not specifically limited herein.

Figure 4:
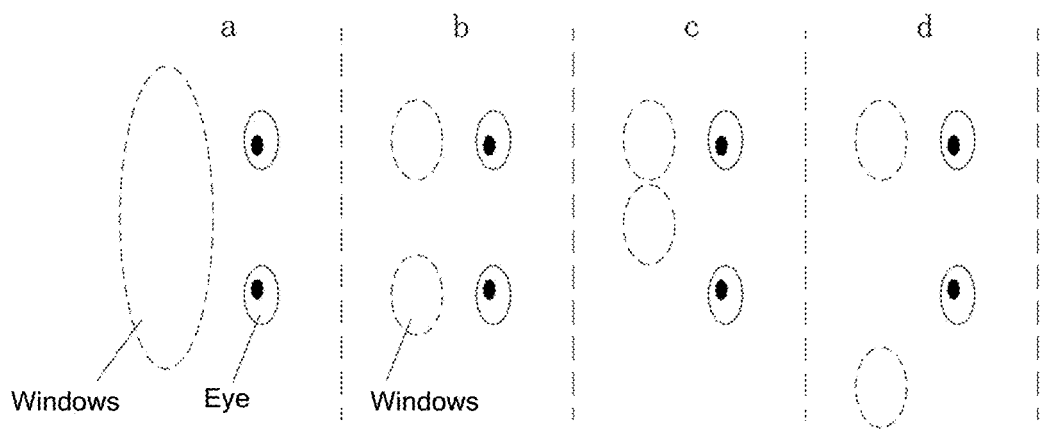
FIG. 4 is a schematic configuration diagram of several off-screen display viewpoints according to Embodiment II of the present disclosure.

As a preferred solution, as shown in FIG. 4, the holographic display system of the present disclosure further includes an interactive motion capturing unit 101 electrically connected to the controller 9. The interactive motion capturing unit 101 is configured to identify a user interactive motion and send information about the user interactive motion to the controller 9. The controller 9 adjusts content of a displayed picture based on the received information about the user interactive motion obtained by the interactive motion capturing unit 101, so as to realize an interactive motion between the user and the picture. Specifically, a camera combined with a machine vision technology may be used to recognize a gesture of the user, to obtain interactive information of the user. Thereby, content displayed on the picture is controlled, or movement of the support structure 8 is controlled to adjust a spatial location and a pose of the projection device and/or the transmissive geometrical holographic screen 7. The controller 9 may also adjust the content of the displayed picture in real time based on the received information about the user interactive motion obtained by the interactive motion capturing unit 101, so as to realize an interactive motion between the user and the picture. For example, a picture is controlled to pan based on a panning gesture signal, or a picture is controlled to magnify, zoom in, zoom out, touch, or another operation based on another corresponding interactive motion.

The setting of the interactive motion capturing unit 101 has a positive significance for an application scenario similar to the wearable application, in which there is a specific spatial location of the user relative to the display system.

In addition, for an application scenario in which a spatial location of the user relative to the display system changes in real time, a human eye tracking unit 102 electrically connected to the controller 9 needs to be set up. The human eye tracking unit 102 is configured to track a location of a human eye and send positioning information of the human eye to the controller 9. The controller 9 controls the support structure 8 to make a corresponding motion response based on the received positioning information of the human eye obtained by the human eye tracking unit 102, to adjust a relative location and/or an overall spatial location of the display element 6 and the transmissive geometrical holographic screen 7, so that the user's eye is always in a visible space of the system. In this way, the user's eye can always receive projection information, and watch the picture normally even in a motion state.

During practical application, the human eye tracking unit 102 and the interactive motion capturing unit 101 may be integrated in a same device, for example, one machine vision camera device is used.

When an ordinary projector is used as the display element 6, the controller 9 sends a picture and information about an average depth of focus of the picture to the projector. After adjusting a projection depth of focus by itself, the projector may project the picture to a specific depth of focus location for a human eye to watch.

It should be noted that ordinary projectors generally have an auto-focusing function. When powered on, the projector may measure a distance between a screen and the projector using a built-in distance sensor, and then drive the lens to adjust to a suitable location, so that a projection depth of focus coincides with the screen. In the system of the present disclosure, the distance sensor provided by the projector may also be removed, in the case, the controller 9 directly sends data about the depth of focus to the projector, so as to control the projection depth of focus. A specific implementation method is the existing mature hardware communication technology. The details are not repeatedly described herein.

Compared with a conventional display system, the transmissive geometrical holographic display system of the present disclosure is very special, i.e., the transmissive geometrical holographic display system cannot be viewed by a large quantity of users simultaneously like a conventional 2D display device. For convenience of expression, a concept of viewpoint is introduced herein.

If a display system may provide one viewing window for one eye, the system has one viewpoint. For a binocular display system, both eyes may watch simultaneously, so the quantity of viewpoints is two. When a display system may be viewed by n eyes simultaneously, the quantity of viewpoints is n. During an actual design, it is also necessary to consider practicality to reasonably set a structure of a system.

Figure 5:
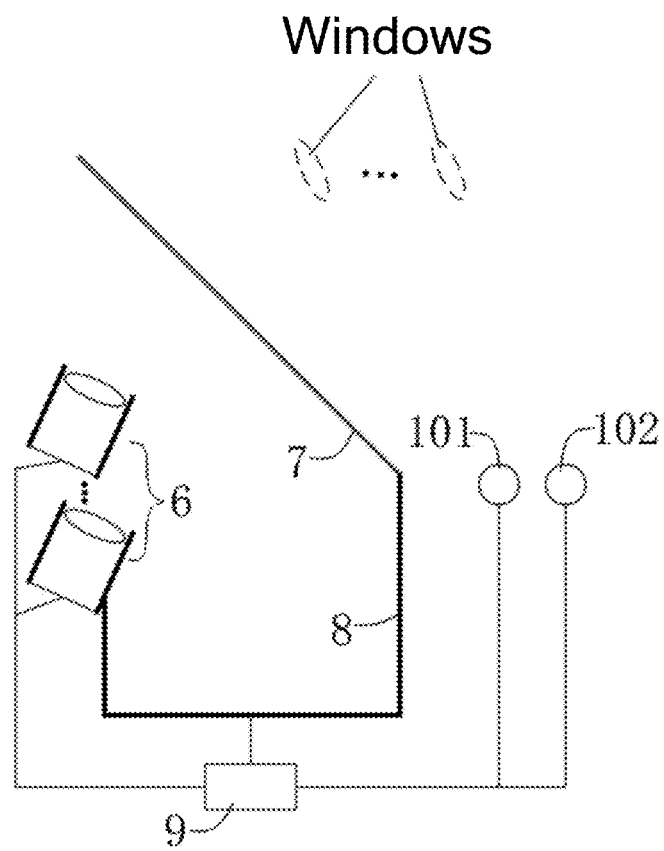
FIG. 5 is a schematic system configuration diagram of a plurality of viewpoints according to Embodiment II of the present disclosure.

As shown in FIG. 5, in a case a, a large-diameter projector is correspondingly used. An outermost lens of the projector may cover the user's two eyes with respect to an optical conjugation region of the transmissive geometrical holographic screen 7 (also a mirror-symmetric region, which may be called a window). Although a region between the two eyes may also be used to watch an image in principle, it is impossible to use the region under an actual condition and only the two eyes may watch simultaneously. Therefore, in this situation, it is equivalent to having two viewpoints.

In cases b to d, two small-diameter projectors are correspondingly used. Projection lenses of the two projectors form two separate sub-regions with respect to the optical conjugation region of the transmissive geometrical holographic screen 7. When a distance between the two sub-regions just matches a distance between the human eyes, both eyes may watch simultaneously (the case b), so there are two viewpoints.

When a distance between the two sub-regions is smaller than a distance between the human eyes (the case c) or larger than the distance between the human eyes (the case d), only one of the two eyes may watch an image, so there is only one viewpoint.

As shown in FIG. 5, similarly, a larger quantity of projectors means a corresponding increase in the quantity of viewpoints of the system. A specific quantity is determined based on the specific situations a to d. The quantity of viewpoints of the display system is n, and is related to a lens size and quantity of the projectors used.

Similarly, when designing a multi-user system, it is necessary to consider a spatial location relationship between users in a usage situation. A spatial distribution of each window is reasonably design to avoid a situation that the quantity of actual available viewpoints of the system is smaller than that of design viewpoints. An effective design strategy is to make the support structure 8 have a function of structural adjustment by reasonably designing the support structure 8. For example, a distance or a spatial location between two projectors may be adjusted. In this way, a geometrical form of the support structure 8 may be flexibly adjusted during use based on a user's pupillary distance and an application site, so as to meet an actual need.

It should be noted that when the projection system is switched to a 2D projection mode for backward compatibility, a focal plane of an image coincides with the screen, and the quantity of viewpoints may be greatly increased. (For example, a projection focal plane of the projector is adjusted to directly project a 2D picture on the transmissive geometrical holographic screen 7. Alternatively, an ordinary projection receiving screen is used as a replacement or is placed on a front or rear surface of the transmissive geometrical holographic screen 7, to receive and display a 2D projection picture.) However, these viewpoints are with great viewing limitations. Based on the viewpoints, only a picture on the screen may be viewed, but an off-screen picture output by the display system cannot be viewed. Therefore, these viewpoints cannot be counted in an actual quantity of viewpoints. Actual effective viewpoints should be viewpoints that can be used to watch a picture in all modes of the system, including viewpoints that may be used to observe off-screen display content on, in front of, and behind the screen.

A conventional 2D display device, such as a TV, a projector, or a computer has a very large quantity of viewpoints, and may be viewed by many users simultaneously. This is because light emitted by a light source of the device has a high degree of divergence and no directivity, and the device also has a relatively high requirement on brightness. However, for the holographic display system of the present disclosure, the quantity of viewpoints is relatively small. Light emitted by the display device of the system (such as a holographic projector or an ordinary projector) may be collected to a window location very efficiently and received by the human eye. Therefore, if a light intensity is too strong, it is easy to cause dizziness, an unclear image, and even damage to a human eye. Further, excessive luminous flux often requires a light source (such as a bulb, an LED light, or the like inside a projector) to operate at high power. However, if the light source operates in a high-power mode for a long time, a service life may be greatly reduced, so the luminous flux cannot be designed too high. However, as the quantity of viewpoints increases, total luminous flux of the display system also needs to be increased, to ensure that each viewpoint can provide a clear picture. Due to a complexity of an optical path of the display system of the present disclosure, there is no simple linear relationship between the viewpoint and the luminous flux.

The quantity of viewpoints of the transmissive geometrical holographic display system of the present disclosure is n. An average diameter of transparent parts of an outermost lens of the projection device included in the display element 6 is D decimeters (dm). An average display luminous flux of the projection device included in the display element 6 is L lumens (lm). A product of the display luminous flux and the viewpoints is $n^{1.27} \cdot L$. In summary, combined with an actual test result, when the product of the display luminous flux and the viewpoints meets $n^{1.27} \cdot L \leq 24000$, it can ensure a relatively good display effect and system reliability.

A measurement method of a display luminous flux L (lm) of a single projection device may refer to a test method of American National Standards Institute (ANSI) lumens as follows.

(1) A distance between the projector and the screen in the display system is set to 2.4 meters.

(2) The screen is 60 inches.

(3) An illuminance meter is used to measure an illuminance of each point on nine intersections of a 田 " shape the screen, and an average illuminance of the nine points is obtained.

(4) The average illuminance multiplied by an area of a projection picture is the ANSI lumens, which is the display luminous flux described in the present disclosure.

For different pictures displayed, a test value of L may be quite different. In an actual test, it is preferable to display an all-white picture for testing, that is, each pixel is displayed as white.

When an illuminated region of the projector cannot be well matched with the screen, an illuminance test is carried out based on an actual illuminated region. Eight points in the illuminated region and evenly in a light band with a distance of about 10 cm to 30 cm away from an outer boundary of the illuminated region and one point in the illuminated region not more than 20 cm away from a center of the screen, namely, a total of nine points, are preferably selected for the illumination test. Then, an average value of nine illuminance values is multiplied by an actual area of the illuminated region to obtain a value of the display luminous flux.

For an application including only one projection device, a display luminous flux may be tested as described above (a display luminous flux of a single projector is the same as an average value of display luminous fluxes). When a plurality of projectors are used, a luminous flux of each projection unit may be tested separately, and an average value is then taken as a value of the display luminous flux.

In addition, in an actual test, different design structures (with such as differences in sealing and heat dissipation) may also have a significant effect on a life of the system. Therefore, different design structures in the actual test process may bring a fluctuation to measured data. However, an overall trend may not change, and an optimal value of a display configuration parameter may not change.

The present disclosure is further described below by taking an ordinary projector as the display element 6 as an example.

Example 1: A projector with a lens diameter of 0.5 dm is used as the display element 6 and the quantity of viewpoints n is 1 for individual user watching with a single eye.

Usually the quantity of user's eyes is an even number, and the quantity of viewpoints n is set to an even number.

Examples 2 to 24: One projector with a lens diameter greater than 6.5 dm or two projectors with a lens diameter less than 6.5 dm are used as the display element 6 and the quantity of viewpoints n is 2 for individual user watching with both eyes.

Example 25: Four projectors with a lens diameter of 0.4 dm are used as the display element 6 and the quantity of viewpoints n in the system is 4 for two users watching simultaneously.

Example 26: Six projectors with a lens diameter of 0.3 dm are used as the display element 6 and the quantity of viewpoints n is 6 for a family of three watching simultaneously.

Example 27: Eight projectors with a lens diameter of 0.2 dm are used as the display element 6 and the quantity of viewpoints n is 8 for a family of four watching simultaneously. The details are shown in the following table.

| Item Example | Quantity of view-points item n | Display luminous flux L (lm) | Lens diameter D (dm) | Product of a display luminous flux and view-points $n^{1.27}$L | $n^{1.27}$L (1-D/27) | Test Environment | User rating | User experience |
|---|---|---|---|---|---|---|---|---|
| Example 1 | 1 | 1500 | 0.5 | 1500 | 1472 | Outdoors | 88 | Brightness of a picture is high, the picture is clear, but viewing comfort with one eye is poor |
| Example 2 | 2 | 9952 | 8.0 | 24000 | 16889 | | 80 | Brightness of a picture is very high, and the picture is clear |
| Example 3 | 2 | 8293 | 7.5 | 20000 | 14444 | | 82 | |
| Example 4 | 2 | 6635 | 7.0 | 16000 | 11852 | | 85 | |
| Example 5 | 2 | 4976 | 6.5 | 12000 | 9111 | | 90 | |
| Example 6 | 2 | 3317 | 6.0 | 8000 | 6222 | | 95 | |
| Example 7 | 2 | 2903 | 5.5 | 7000 | 5574 | | 93 | |
| Example 8 | 2 | 2488 | 5.0 | 6000 | 4889 | | 92 | |
| Comparative Example 1 | 2 | 13000 | 8.0 | 31351 | 22062 | | 50 | A picture is a bit dazzling, and if viewing the picture for a long time, eyes are very uncomfortable |
| Example 9 | 2 | 2073 | 4.5 | 5000 | 4167 | | 90 | Brightness is high, and a picture is clear |
| Example 10 | 2 | 1659 | 4.0 | 4000 | 3407 | | 85 | |
| Example 11 | 2 | 1244 | 3.5 | 3000 | 2611 | | 85 | |
| Example 12 | 2 | 829 | 3.0 | 2000 | 1778 | Indoors daytime | 90 | Brightness is medium, a picture is clear, and there is a strong stereoscopic effect |
| Example 13 | 2 | 622 | 2.5 | 1500 | 1361 | | 90 | |
| Example 14 | 2 | 415 | 2.0 | 1000 | 926 | | 95 | |
| Example 15 | 2 | 207 | 1.5 | 500 | 472 | | 95 | |
| Example 16 | 2 | 124 | 1.4 | 300 | 284 | | 89 | A light intensity is soft, and there is a realistic picture effect |
| Example 17 | 2 | 83 | 1.3 | 200 | 190 | | 85 | |
| Example 18 | 2 | 41 | 1.2 | 100 | 95.6 | | 85 | |
| Example 19 | 2 | 33 | 1.1 | 80 | 76.7 | Indoors night | 95 | Contrast of a picture is high, and it is comfortable to watch |
| Example 20 | 2 | 21 | 1.0 | 50 | 48.1 | | 90 | |
| Example 21 | 2 | 12 | 0.9 | 30 | 29.0 | | 90 | |
| Example 22 | 2 | 8 | 0.8 | 20 | 19.4 | | 90 | |
| Example 23 | 2 | 4 | 0.7 | 10 | 9.7 | | 85 | |
| Example 24 | 2 | 1 | 0.6 | 2 | 2.0 | | 80 | |
| Example 25 | 4 | 1500 | 0.4 | 8724 | 8595 | Outdoors | 90 | Brightness is high, a picture is clear, and it is more comfortable for two persons |
| Example 26 | 6 | 1500 | 0.3 | 14600 | 14437 | Outdoors | 90 | An effect of a picture is good, but when three persons use the display element, an activity space for each other is limited |
| Example 27 | 8 | 1500 | 0.2 | 21039 | 20883 | Outdoors | 86 | An effect of a picture is good, but when four persons use the display element, it is very inconvenient for each other to move |

Data from examples 1 to 27 show that when a product of a display luminous flux and a viewpoint $n^{1.27} \cdot L \leq 24000$, display effects are all relatively good, and user ratings are all above 80. A product of a display luminous flux and a viewpoint in Comparative Example 1 $n^{1.27} \cdot L=31351$, so a user rating is low, for the picture is dazzling, and an actual display effect is not good.

In actual use, in addition to considering a design relationship between, the quantity of viewpoints n and the luminous flux L, an aperture size of a single projector and the luminous flux also need to be matched. When the aperture of the single projector is relatively large, a visual utilization of display light may be relatively low, for a lot of light may only reach a region outside the human eye. Therefore, it is necessary to appropriately increase the luminous flux at this time. According to application of the examples 1 to 27, a design may be carried out with reference to the following expression during a practical application:

$$n^{1.27} \cdot L \cdot \left(1 - \frac{D}{27}\right) \leq 20883$$

Based on an influence of a light source power on the display effect and reliability of the system, when an internal light source of the projector is operated in a high-power mode, a lifespan tends to be greatly reduced. Therefore, the light source may be operated in a low power mode as much as possible. However, when the quantity of viewpoints is relatively large or when the aperture of the single projector is relatively large, the visual utilization of display light may be relatively low, for a lot of light may only reach the region outside the human eye. Therefore, it is necessary to appropriately increase the light source power at this time, to improve the luminous flux. An average power of a projection light source of the projection device included in the display element 6 is P watts (W). During tests, it is found that the system may run under a better condition when the following relational expression is satisfied:

$$n^{1.27} \cdot P \cdot \left(1 - \frac{D}{27}\right) \leq 630$$

A light source power P of the projection device may be measured by directly testing voltages of two ends of the light source and a current passing through the light source under a normal working state of the projection device. Then, multiplication calculation is performed to obtain the power.

Based on examples 1 to 27, a light source power P (W) is further introduced for description. See the table below for details.

| Item Example | Quantity of view-points item n | Display luminous flux L (lm) | Power of a projector $P (w) | Lens diameter D (dm) | $n^{1.27} L$ (1-D/27) | $n^{1.27} P$ (1-D/27) | Testing environment | User rating | User experience |
|---|---|---|---|---|---|---|---|---|---|
| Example 1 | 1 | 1500.0 | 45.22 | 0.5 | 1472.2 | 44.4 | Outdoors | 88 | Brightness of a picture is high, the picture is clear, but viewing comfort with one eye is poor |
| Example 2 | 2 | 9951.8 | 300.76 | 8.0 | 16888.9 | 510.4 | | 80 | Brightness of a picture is very high, and the picture is clear |
| Example 3 | 2 | 8293.2 | 250.31 | 7.5 | 14444.4 | 436.0 | | 82 | |
| Example 4 | 2 | 6634.6 | 200.80 | 7.0 | 11851.9 | 358.7 | | 85 | |
| Example 5 | 2 | 4975.9 | 150.76 | 6.5 | 9111.1 | 276.0 | | 90 | |
| Example 6 | 2 | 3317.3 | 100.43 | 6.0 | 6222.2 | 188.4 | | 95 | |
| Example 7 | 2 | 2902.6 | 87.50 | 5.5 | 5571.1 | 168.0 | | 93 | |
| Example 8 | 2 | 2488.0 | 75.67 | 5.0 | 4888.9 | 148.7 | | 92 | |
| Comparative Example 1 | 2 | 13000.0 | 400.00 | 3.0 | 22062.0 | 679.0 | | 50 | A picture is a bit dazzling, and if viewing the picture for a long time, eyes are very uncomfortable |
| Example 9 | 2 | 2073.3 | 63.48 | 4.5 | 4166.7 | 127.6 | | 90 | Brightness is high, and a picture is clear |
| Example 10 | 2 | 1658.6 | 50.48 | 1.0 | 3407.4 | 103.7 | | 85 | |
| Example 11 | 2 | 1244.0 | 37.95 | 3.5 | 2611.1 | 79.7 | | 85 | |
| Example 12 | 2 | 829.3 | 25.00 | 3.0 | 1777.8 | 53.6 | Indoors daytime | 90 | Brightness is medium, a picture is clear, and there is a strong stereoscopic effect |
| Example 13 | 2 | 622.0 | 18.75 | 2.5 | 1361.1 | 41.0 | | 90 | |
| Example 14 | 2 | 414.7 | 12.50 | 2.0 | 925.9 | 27.9 | | 95 | |
| Example 15 | 2 | 207.3 | 6.25 | 1.5 | 472.2 | 14.2 | | 95 | |
| Example 16 | 2 | 124.4 | 3.75 | 1.4 | 284.4 | 8.6 | | 89 | A light intensity is soft, and there is a realistic picture effect |
| Example 17 | 2 | 82.9 | 2.50 | 1.3 | 190.4 | 5.7 | | 85 | |
| Example 18 | 2 | 41.5 | 1.25 | 1.2 | 95.6 | 2.9 | | 85 | |
| Example 19 | 2 | 33.2 | 1.00 | 1.1 | 76.7 | 2.3 | Indoors night | 95 | Contrast of a picture is high, and it is comfortable to watch |
| Example 20 | 2 | 20.7 | 0.62 | 1.0 | 48.1 | 1.5 | | 90 | |
| Example 21 | 2 | 12.4 | 0.37 | 0.9 | 29.0 | 0.9 | | 90 | |
| Example 22 | 2 | 8.3 | 0.25 | 0.8 | 19.4 | 0.6 | | 90 | |
| Example 23 | 2 | 4.1 | 0.12 | 0.7 | 9.7 | 0.3 | | 85 | |
| Example 24 | 2 | 0.8 | 0.02 | 0.6 | 2.0 | 0.1 | | 00 | |
| Example 25 | 4 | 1500.0 | 45.22 | 0.4 | 8594.6 | 259.1 | Outdoors | 90 | Brightness is high, a picture is clear, and it is more comfortable for two persons |
| Example 26 | 6 | 1500.0 | 45.22 | 0.3 | 14437.5 | 435.2 | Outdoors | 90 | An effect of a picture is good, but when three persons use the display element, an activity space for each other is limited |
| Example 27 | 8 | 1500.0 | 45.22 | 0.2 | 20882.7 | 629.5 | Outdoors | 86 | An effect of a picture is good, but when four persons use the display element, it is very inconvenient for each other to move |

Data shows that: when a product of a power and viewpoints $$n^{1.27} \cdot P \cdot \left(1 - \frac{D}{27}\right) \leq 630,$$

display effects are all relatively good, and user ratings are all above 80. However, when a product of a power and viewpoints in Comparative Example 1

$$n^{1.27} \cdot P \cdot \left(1 - \frac{D}{27}\right) = 679,$$

a user rating is low, for the picture is dazzling, and an actual display effect is not good. In addition, when the light source power is less than 400 W, it can basically meet a design life of five years, so reliability can be guaranteed.

In the implementations, the ordinary projector used may also be replaced by a holographic projector or another projection device capable of displaying a three-dimensional picture. Further, the design formulas involving the quantity of viewpoints, the light source power, and the display luminous flux are also applicable to the holographic projector.

In addition, in the actual test, it was also found that in an accelerated test of a high temperature and high humidity environment (85° C. and 85% relative humidity) of examples 1 to 27, the light source can still work normally for 3000 h. However, the light source is damaged at 3000 h and cannot emit light in Comparative Example 1. This shows that an unreasonable design parameter may greatly reduce a service life. The above test is commonly known as a double 85 aging test. A 3000 h accelerated aging test is equivalent to a minimum service life standard of five years under an actual working condition.

Data of the examples may also show that a display effect and reliability of the holographic display system may be effectively improved by reasonable optical parameter setting.

The principle of the display system described in the present disclosure can refer to a patent with the application No. 201910875975.1. Here is a brief introduction. A projector may project pictures at different depths in space. In other words, additional depth-of-field information may be provided for a projection picture. However, the picture projected by the projector is with divergent light, and cannot be directly viewed by the human eye. This is why a conventional projection system must use a receiving screen.

Under optical path conversion, the transmissive geometrical holographic screen 7 can make the divergent light projected by the projector re-converge to the optical conjugate location of the projector relative to the transmissive geometrical holographic screen 7, that is, a mirror image location of the projector. Thereby, converging light is formed, and can be directly viewed by the human eye. Therefore, although the transmissive geometrical holographic screen 7 is used in the holographic display system of the present disclosure, a function of the transmissive geometrical holographic screen 7 is completely different from that of the receiving screen of the conventional projection display system. The receiving screen of the conventional projection systems is configured to randomly scatter the light for viewing by the user. The transmissive geometrical holographic screen 7 is more like a special optical element, and can perform a specific optical conversion on light by re-converging light emitted by a light spot on one side of the screen to an extremely small region near a mirror image location of the light spot relative to the screen. Thereby, a converging real image point suspended in the air is formed. This unique imaging feature makes it possible to image at different depths in space (off-screen imaging), to achieve true 3D display.

Figure 6:
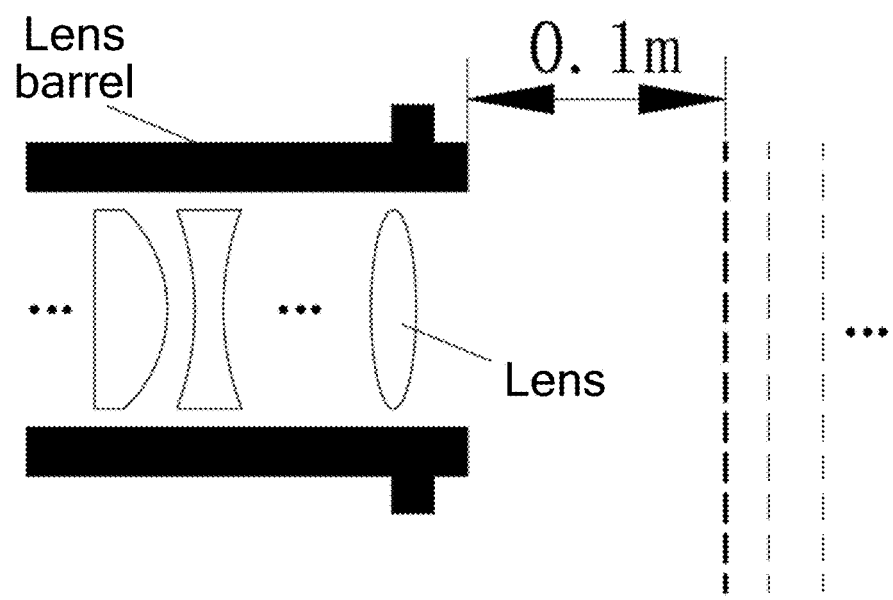
FIG. 6 is a schematic diagram of spaces of 0.1 m and greater than 0.1 m away from an outermost lens of a projection lens according to Embodiment II of the present disclosure.

From analysis of the display principle of the present disclosure, it can be found that when the projector is used, the picture seen by the user is exactly the same as the picture projected by the projector. A distance between the picture projected by the projector and the outermost lens of the projector is the same as that between the picture seen by the user and the eye. In life, a visual distance of the human eye is generally 25 cm, and a closest object is generally 10 cm away from the human eye. Therefore, when a projector is chosen, a projector (ordinary projector or holographic projector) whose projection depth of focus may be adjusted in a space greater than 0.1 m from an outer surface of an outermost lens of a projection lens (such as FIG. 6) is preferred.

When the user is in a static state, as long as the system structure is adjusted so that the user's eye is covered by the window, the user can watch the picture normally. However, if the user is in a motion state, the eye may easily leave the window and cannot watch the picture normally. Therefore, for an application scenario in which the user cannot be completely stationary, it is very important to increase positioning tracking for the user's eye. Then, a spatial location of the window is adjusted in real time, so that the window always covers the user's eye. However, in actual scenarios, component parameters of the display system are different, and it is difficult to find a set of tracking methods suitable for all systems. In principle, if a motion trajectory of the user's eye may be positioned very accurately, a relative location and an overall spatial location between the projector and the transmissive geometrical holographic screen may be adjusted to drive the window to accurately track the motion trajectory of the user's eye. This is the most ideal solution.

However, it is very difficult to completely accurately track the user's eye and precisely control the location of the window. Even if this may be realized, it needs to pay relatively large costs and is not very practical.

In fact, because the window has a size, the human eye may see the picture as long as the human eye is within the window. Therefore, when the user moves, there is no need to completely accurately track a motion trajectory of the user's eye, as long as ensure that the user's eye is within the window by roughly tracking. Even if the user's eye is slightly offset out of the window, but a pupil intersects with the window, the picture may be viewed normally.

Figure 7:
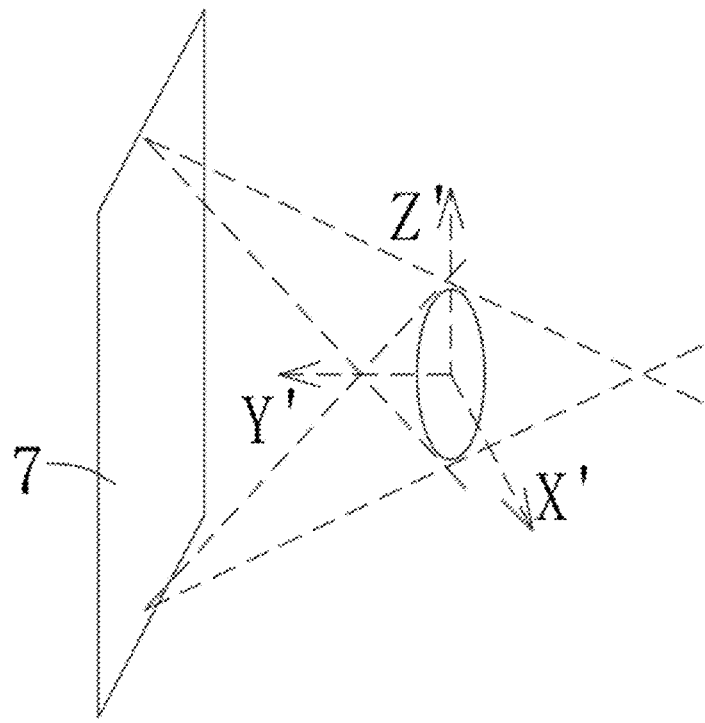
FIG. 7 is a schematic diagram of an ellipsoid visible space, that is, a window according to Embodiment II.

The discussion mainly focuses on a situation in which the user moves up and down relative to the screen. In addition, when the user moves back and forth, if the user does not deviate too much from a center of the window, the picture may be viewed completely normally. In summary, the tracking of the user's eye does not need to be particularly accurate. As long as accuracy is ensured, a usage requirement can be met. Specifically, as shown in FIG. 7, light above and below the screen may have an intersecting rhombus region. In principle, as long as the support structure is adjusted in real time so that the user's eye is always in the rhombus visible space, the picture may be observed. However, a problem of tracking loss is relatively easy to occur near a corner of the rhombus. Therefore, a relatively small ellipsoid visible region is further defined inside the rhombus region, to reduce a probability of tracking loss.

Figure 8:
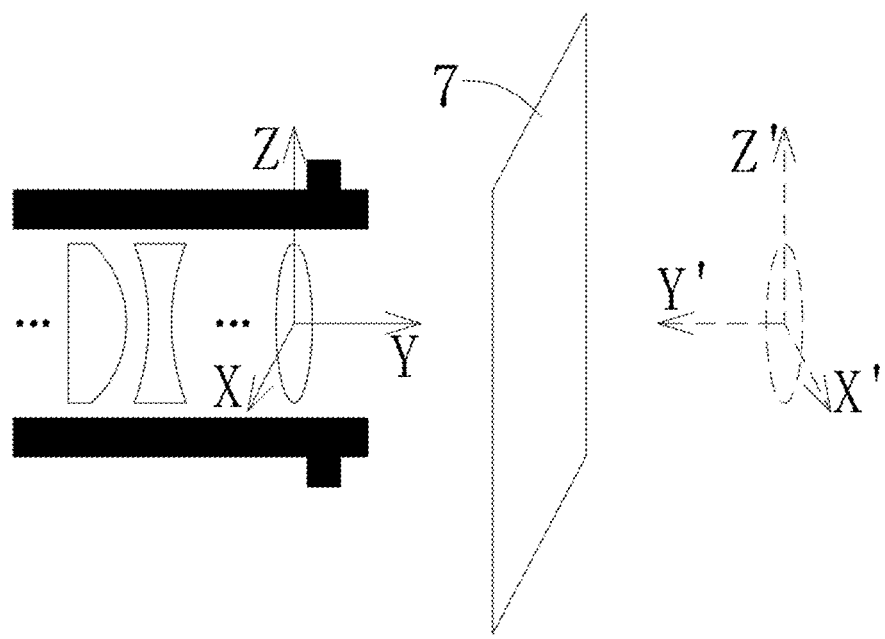
FIG. 8 is a schematic diagram of a coordinate system (X', Y', Z') in which the ellipsoid visible space is located according to Embodiment II of the present disclosure.

The ellipsoid region may be described below. As shown in FIG. 8, a center of an outermost lens of each projector of the display element 6 is taken as an origin. An outer normal of a lens center is taken as a Y-axis direction. A line passing through the origin and perpendicular to a horizontal plane is taken as an X axis. A line passing through the origin and perpendicular to the X and Y axes is taken as a Z axis. This forms a coordinate system (X, Y, Z). The ellipsoid visible space is a space satisfying the following relational expression under an optical conjugate coordinate system (X', Y', Z') of the coordinate system (X, Y, Z) relative to the transmissive geometrical holographic screen 7:

$$\frac{y'^2}{m \cdot D^2} + \frac{x'^2 + z'^2}{(D+K)^2} \leq 1,$$

where, K is an expansion constant in decimeters, and a range of K is 0<K<0.08; and m is a conjugate deviation constant, and a range of m is 0≤m≤5.

The above expression is a space enclosed by an ellipsoid, where a value of m affects a length of the ellipsoid in the y-axis direction. As can be seen from FIG. 7, the visible space has an extension in the Y' axis direction. It is found in an actual test that when an extension of the visible space in the Y' axis direction is about six times the lens diameter D, a clear picture may be seen in this range. However, in considering of an actual tracking effect, it is relatively easy to achieve a relatively good display effect when an extension length is within a range of the Y' axis direction less than five times the lens diameter. Furthermore, it is found in an actual test as follows:

When m is set to 5, an entire display region of the picture may be clearly seen, picture clarity is slightly worse only in a local boundary region, but a display detail may still be clearly distinguished.

When m is set to 3, an entire display region of the picture may be clearly seen, the picture is relatively clear even in a boundary region, and tracking stability is also very good.

When m is set to 2, an entire display range of the picture is complete, a display detail is very clear, and tracking stability is relatively good, but there is an occasional tracking loss, so this is suitable for a desktop office scenario.

Alternatively, when m is 1, an entire display range of the picture is complete, a display detail is very clear, tracking stability is slightly poor, and a tracking loss frequency increases, so this is suitable for movie viewing entertainment application scenario.

K and D determine a section of a visible space in a plane perpendicular to the Y' axis. In principle, a picture may be viewed within a diameter range of the projection lens. In fact, a picture may be seen, as long as the human eye intersects the optical conjugation region of the projection lens, even if the person is not completely within the optical conjugation region of the projection lens. Therefore, an expansion constant K is introduced, and a value of K depends on a diameter of the human eye. Generally, a maximum diameter of a pupil of the human eye is 0.08 dm, so 0.08 dm is taken as the expansion constant herein.

Although, m cannot be set to 0 mathematically, but setting to 0 herein has a physical meaning, that is, a point on the plane on which Y' is equal to 0.

According to the present disclosure, when a plurality of projectors (ordinary projectors or holographic projectors) are used, an exact same model may be selected, or different models may be selected based on an actual requirement in an application scenario.

For the display system of the present disclosure, since the depth of focus is adjustable, it can avoid visual fatigue caused by user's long time watching a picture with a specific depth of focus. This avoids an occurrence of myopia and can improve a vision level.

The present disclosure may be used for fixed display, such as office, home theater, and vehicle-mounted display, and may also be used for fields of small mobile display, head-mounted display, and the like. Masses of projection devices in different application scenarios are selected as follows:

Desktop application: A projection device with a mass less than 5 kg is preferred.

Mobile terminal: A projection device with a mass less than 300 g is preferred.

Wearable application: A projection device with mass less than 100 g is preferred.

During implementation of the present disclosure, some optical elements such as an anti-reflection film, a light absorption film, and a filter may be appropriately added, to further improve the effect of the system.

Compared with the prior art, Embodiment II of the present disclosure has the following advantages:

1. The ordinary projection device projects the two-dimensional picture on the focal plane in space. The controller adjusts the depth of focus of the projection picture, to display the picture with the depth-of-field information, and present the more realistic 3D effect. This overcomes a shortage limitation of 3D film sources. Further, the ordinary projection device is used as the display element. This can greatly reduce costs and improve practicality.

2. The reasonable optical parameter setting can effectively improve the display effect and reliability of the holographic display system.

Embodiment III

Referring to FIG. 9 to FIG. 12, the present disclosure provides a geometrical holographic display system with folded optical path, including at least one projector 6, a transmissive geometrical holographic screen 7, a support structure 8, a controller 9, and at least one optical path folding mirror group 10.

For relevant content of the projector 6 in this example, refer to the display element in Embodiment II. This is not described in this embodiment.

Different from Embodiment II, the support structure 8 in this embodiment is matched with the projector 6, the transmissive geometrical holographic screen 7, and the optical path folding mirror group 10 separately, and provides physical structural support for the projector 6, the transmissive geometrical holographic screen 7, and the optical path folding mirror group 10. Specifically, the support structure 8 may be made into a support frame with a fixed structure. At this time, the display system of the present disclosure is fixed as a whole, and a user needs to be in a specific location to observe a picture.

The optical path folding mirror group 10 is supported by the support structure 8, and includes at least one plane mirror with a reflective function, to change a propagation path of light projected by the projector 6. Specifically, the optical path folding mirror group 10 is disposed on one side of the transmissive geometrical holographic screen 7. Alternatively, when there are a plurality of optical path folding mirror groups 10, the optical path folding mirror groups 10 are disposed on one side of the transmissive geometrical holographic screen 7, or separately disposed on both sides of the transmissive geometrical holographic screen 7. This depends on a spatial form of an applied scenario.

The controller 9 is electrically connected with the projector 6. The projector 6 may adjust a depth of field and picture content of a projection picture based on a control signal of the controller 9.

In order to increase flexibility of the display system, the support structure 8 may also be set as a movable or deformable structure. The support structure 8 and the controller 9 are electrically connected. The support structure 8 makes a corresponding response motion based on control information of the controller 9, so as to achieve relative movement and/or overall movement among the projector 6, the transmissive geometrical holographic screen 7, and the optical path folding mirror group 10. In this way, a visual window of the system always covers a user's eye, so that the user can normally watch the picture in different directions. It should be noted that the support structure 8 is based on a general prior art, and may be designed by those skilled in the art based on a space condition of a practical application. For example, using some hinge structures and structures similar to umbrella shafts, it is very easy to design the deformable structure. This is not specifically limited herein.

Also as a preferred solution, the holographic display system of the present disclosure also includes an interactive motion capturing unit and a human eye tracking unit that are electrically connected to the controller 9. For the interactive motion capturing unit and the human eye tracking unit, correspondingly refer to specific content of the interactive motion capturing unit 101 and the human eye tracking unit 102 in Embodiment II. This is not described in this embodiment. For relevant content of the support structure, refer to the relevant content in Embodiment II. This is not described in this embodiment.

Similarly, when an ordinary projector is used as a projector, a specific focusing process may refer to the relevant content in Embodiment II. This is not described in this embodiment.

One projector 6 is taken as an example for description in the present disclosure.

Figure 9:
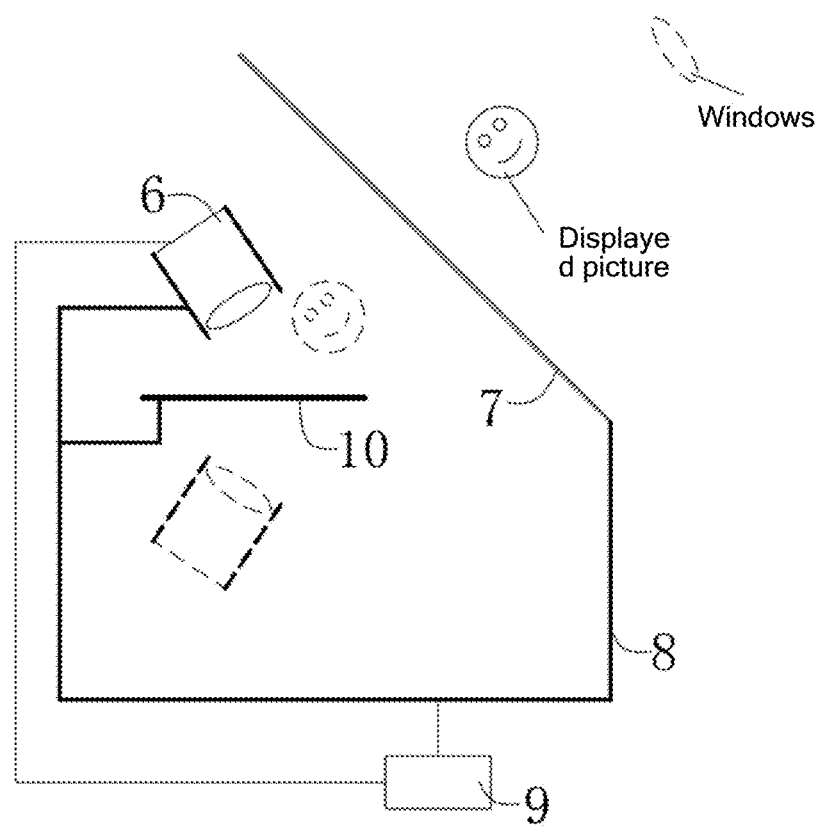
FIG. 9 is a schematic diagram of a system of the present disclosure including one projector 6 and one optical path folding mirror group according to Embodiment III of the present disclosure.

As shown in FIG. 9, one optical path folding mirror group 10 located on the same side as the projector 6 is disposed in the system. After a projection picture of the projector 6 is optically converged by the optical path folding mirror group 10 and the transmissive geometrical holographic screen 7, an off-screen displayed picture is formed on another side of the transmissive geometrical holographic screen 7. The displayed picture may be seen by a human eye through a window as shown in the figure.

Figure 10:
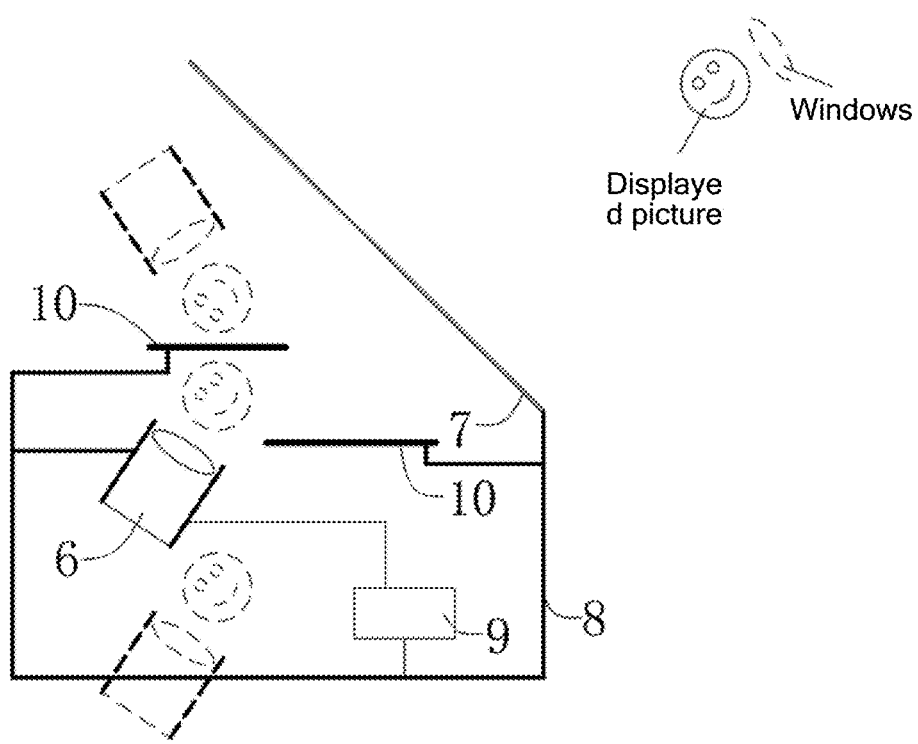
FIG. 10 is a schematic diagram of a system in which one optical path folding mirror group is added on a same side on a basis of FIG. 9 according to Embodiment III of the present disclosure.

As shown in FIG. 10, two optical path folding mirror groups 10 are disposed in the system, and both are located on the same side as the projector 6 relative to the transmissive geometrical holographic screen 7. After a projection picture of the projector 6 is optically converged by the two optical path folding mirror groups 10 and the transmissive geometrical holographic screen 7, an off-screen displayed picture is formed on another side of the transmissive geometrical holographic screen 7. The displayed picture may be seen by a human eye through a window as shown in the figure.

Figure 11:
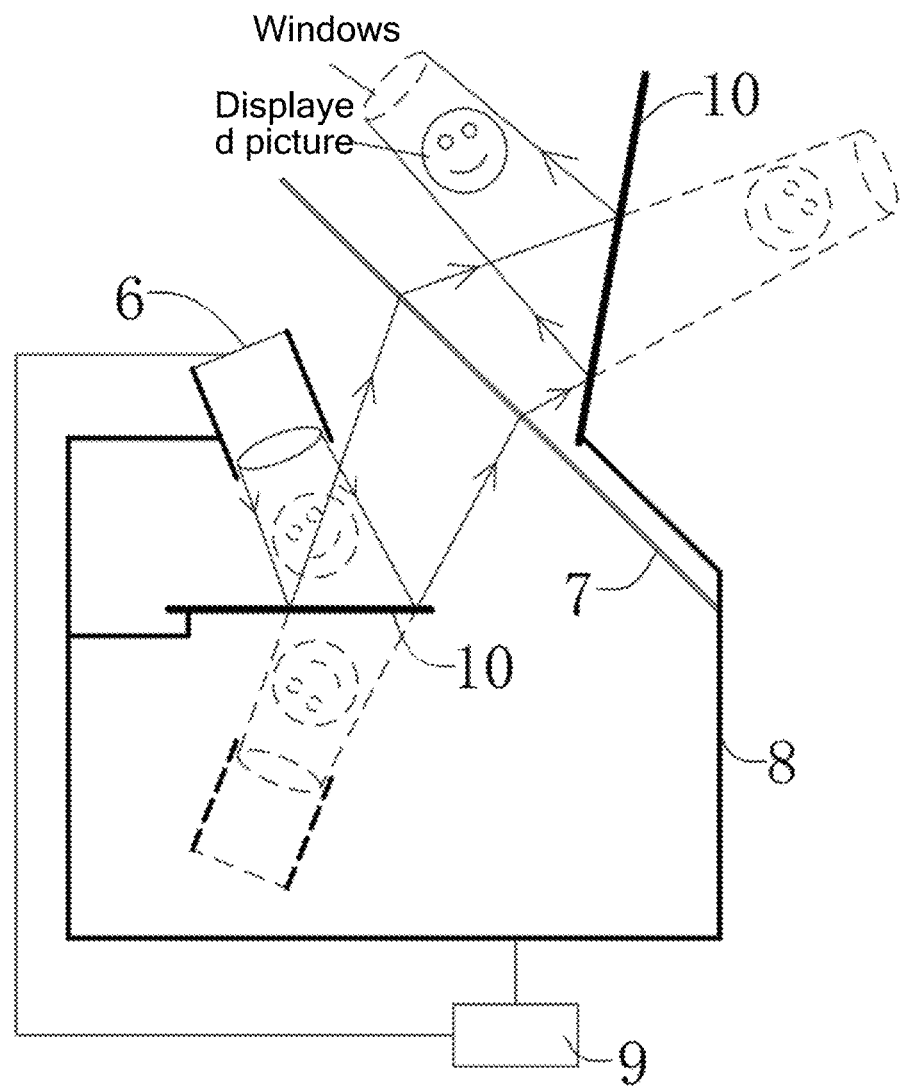
FIG. 11 is a system diagram in which the optical path folding mirror groups are separately disposed on both sides of a transmissive geometrical holographic screen and an optical path diagram of optical conversion according to Embodiment III of the present disclosure.
Figure 12:
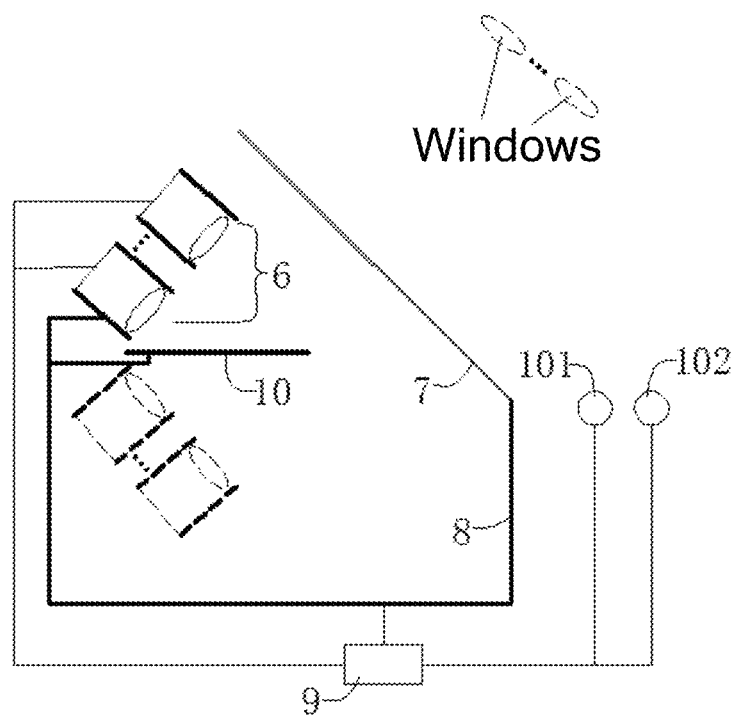
FIG. 12 is a schematic diagram of system configuration of a plurality of viewpoints of the present disclosure according to Embodiment III of the present disclosure.

As shown in FIG. 11, two optical path folding mirror groups 10 are also disposed in the system, but are separately disposed on both sides of the transmissive geometrical holographic screen 7. After a projection picture of the projector 6 is optically converged by the two optical path folding mirror groups 10 and the transmissive geometrical holographic screen 7, an off-screen displayed picture is formed on another side of the transmissive geometrical holographic screen 7. The displayed picture may be seen by a human eye through a window as shown in the figure.

It should be noted that, for an optical conversion principle of the optical path folding mirror group 10 and the transmissive geometrical holographic screen 7 to the projection picture of the projector 6, refer to an optical path conversion principle in FIG. 11. When the quantity of optical path folding mirror groups 10 is larger, all kinds of arrangement and combination belong to the protection scope of the present disclosure, as long as the projection picture of the projector 6 may be optically converged to form an off-screen displayed picture at an optical conjugation region.

The above is only an illustration of the present disclosure, not a limitation of the present disclosure. The present disclosure is also applicable to a plurality of projectors 6.

Compared with a conventional display system, what's special the geometrical holographic display system with folded optical path of the present disclosure lies in that the geometrical holographic display system with folded optical path cannot be viewed by a large quantity of users simultaneously like a conventional 2D display device. For convenience of expression, a concept of viewpoint is also introduced herein. Specifically, refer to the illustration of the viewpoint in Embodiment II. This is not described in this embodiment.

In this embodiment, an effect of a corresponding display system is illustrated by using an example in which the projector 6 in the display system is an ordinary projector, the quantity of the optical path folding mirror group 10 is one, and the optical path folding mirror group 10 and the projector 6 are disposed on the same side of the transmissive geometrical holographic screen 7. It should be noted that, when same parameters are used, data parameters of Example 1 to Example 27 may all refer to the table in Embodiment II. This is not described in this embodiment. Further, for an obtained effect conclusion is the same, this is not described in this embodiment.

Figure 13:
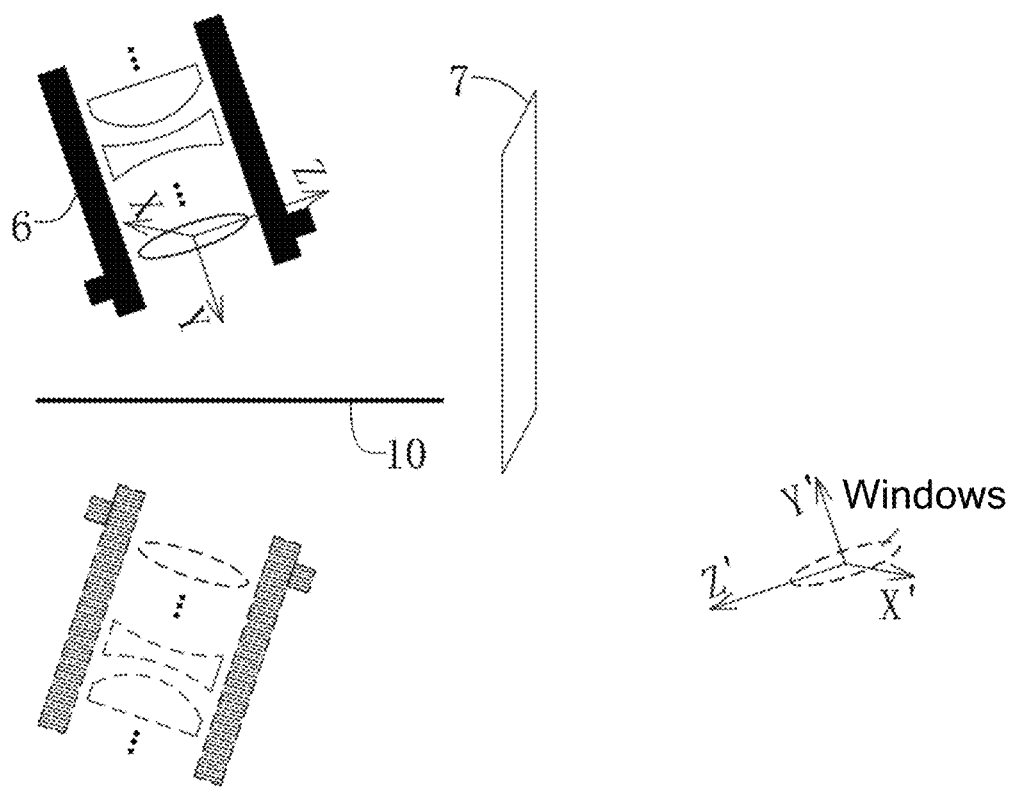
FIG. 13 is a schematic diagram of a coordinate system (X', Y', Z') in which an ellipsoid visible space is located according to Embodiment III of the present disclosure.

Different from Embodiment II, an ellipsoid region in this embodiment is specifically shown in FIG. 13. A center of an outermost lens of each projector 6 is taken as an origin. An outer normal of a lens center is taken as a Y-axis direction. A line passing through the origin and perpendicular to a horizontal plane is taken as an X axis. A line passing through the origin and perpendicular to the X and Y axes is taken as a Z axis. This forms a coordinate system (X, Y, Z). An ellipsoid visible space is a space satisfying the following relational expression under an optical conjugate coordinate system (X', Y', Z') obtained after optical conversion of the coordinate system (X, Y, Z):

$$\frac{y'^2}{m \cdot D^2} + \frac{x'^2 + z'^2}{(D+K)^2} \le 1,$$

where K is an expansion constant in decimeters, and a range of K is 0<K<0.08; and m is a conjugate deviation constant, and a range of m is 0≤m≤5.

For other content, refer to the description in Embodiment II.

Compared with the prior art, Embodiment III of the present disclosure has the following advantages:
1. An optical path folding mirror group that can change the propagation path of the light projected by the projector is introduced, so as to flexibly convert and fold the optical path. This can reasonably utilize the space, reduce a space occupancy rate of the entire display system, and effectively improve layout flexibility of the display system.
2. The projector adopts an ordinary projection device capable of projecting a two-dimensional picture. This can greatly reduce costs and improve practicality. The ordinary projection device can project the two-dimensional picture on a focal plane in space. The controller adjusts a depth of focus of the projection picture, to display the picture with depth-of-field information, and present the more realistic 3D effect. This overcomes a shortage limitation of 3D film sources and reduces costs.
3. The reasonable optical parameter setting can effectively improve the display effect and reliability of the holographic display system.

Embodiment IV

As shown in FIG. 14 to FIG. 18, the present disclosure provides a reflective geometrical holographic display system, including at least one projector 6, the auxiliary imaging screen 7, the reflective geometrical holographic screen 11, the support structure 8, and the controller 9.

For relevant content of the projector 6 in this embodiment, refer to the display element in Embodiment II. This is not described in this embodiment.

Different from Embodiment II, the auxiliary imaging screen 7 is used for light splitting in this embodiment. A transflective film is preferred. After light projected by the projector 6 is irradiated on the auxiliary imaging screen 7, the light is partially reflected on the reflective geometrical holographic screen 11. The reflective geometrical holographic screen 11 modulates the light, so that any light irradiated on the reflective geometrical holographic screen 11 returns in an original direction after retro-reflection. The retro-reflected light partially passes through the auxiliary imaging screen 7, so as to form an off-screen projection picture in the air.

The reflective geometrical holographic screen 11 is configured to retro-reflect incident light that is at another angle not parallel to a section and that is irradiated on the reflective geometrical holographic screen 11. The light may be retro-reflected after being shifted by a distance of d mm. d is a distance from an intersection of outgoing light and an incident surface of the reflective geometrical holographic screen 11 to the incident light, and d≤2 mm. (Usually, for a screen similar to a giant-screen movie in a cinema, because a user is far away from the screen, it is not easy for a human eye to distinguish an image point deviation 2 mm. A relatively clear picture may still be displayed. However, if a deviation is too large, picture quality may be affected.) A flexible holographic screen is preferred. There are one or two reflective geometrical holographic screens 11. When there is one reflective geometrical holographic screen 11, the reflective geometrical holographic screen 11 is disposed on either side of the auxiliary imaging screen 7. When there are two reflective geometrical holographic screens 11, the two reflective geometrical holographic screens 11 are separately disposed on both sides of the auxiliary imaging screen 7. When the system includes two reflective geometrical holographic screens 11, a light energy utilization rate and imaging quality of the system are both relatively high.

Preferably, as shown in FIG. 19 to FIG. 22, a series of cylindrical elementary prisms 111 whose cross section is a right triangle or a pentagon including a rectangle and a right triangle are disposed inside the reflective geometrical holographic screen 11. The right triangle is preferably an isosceles right triangle.

A plurality of transparent layers 112 and reflective layers 113 are alternately arranged along a length direction in an interior of the cylindrical elementary prism 111. This structure may be obtained by top-down two-dimensional machining. A processing technology is extremely simple, processing accuracy is very high, and imaging quality is excellent.

A bottom surface of the cylindrical elementary prism 111 is a light incident surface. The reflective layers 113, end surfaces of the cylindrical elementary prism 111, and inclined planes where right-angle sides of the cross section of the cylindrical elementary prism 111 are located, are reflective surfaces. A layer of reflective film 114 for specular reflection of light is disposed on each inclined plane on which the right-angle side of the right triangle included in the cross section of the cylindrical elementary prism 111 is located.

For another solution, a layer of reflective film 114 for reflecting light may also be disposed on the end surfaces of the cylindrical elementary prism 111 used as the reflective surfaces. It should be noted during processing that if the end surfaces of the cylindrical elementary prism 111 are the reflective layer 113, it is not necessary to coat the reflective film 114 on an end surface of the reflective layer 113 for the reflective layer 113 has a function of specular reflection of light.

In addition, there is no reflective layer 113 inside a prism of the right triangle of the cylindrical elementary prism (111) whose cross section is the pentagon comprising the rectangle and right triangle.

An error range of angles involved in the cross section of the cylindrical elementary prism is within ±5°, including a right angle of the right triangle and that of the pentagon on the cross section, and an angle formed between the length direction of the cylindrical elementary prism 111 and the transparent layer 112 and an angle formed between the length direction of the cylindrical elementary prism 111 and the reflective layer 113. The above principle is based on an ideal geometrical shape. However, in practice, a completely ideal geometrical shape may not be produced during a machining process. An angle may have an error. A vertex cannot be an ideal geometrical point, and is a fillet with a very small radius. When an error during manufacturing is relatively small, a direction of the reflection light deviates slightly from an ideal case of retro-reflection. These deviations cannot be distinguished by the human eye, and the aberrations caused by these errors are also very small. Therefore, a very good imaging effect can also be achieved.

For example, when an error of the right angle included in the cross section of the cylindrical elementary prism 111 is within ±5°, user experience is relatively satisfied. When this range is exceeded, the user begins to feel that an imaging effect is unacceptable. Similarly, the geometrical vertex is allowed to be a relatively small fillet (for example, a radius is less than 0.1 mm). Then, a relatively good imaging function can also be achieved. Certainly, a smaller error brings a higher user evaluation, so the error needs to be minimized during production.

Certainly, a smaller error brings a higher user evaluation, so the error needs to be minimized during production. A similar machining error is also applicable to cutting and bonding directions.

In specific application, when an angle error of a living room application is within ±2.5°, user experience is relatively satisfied.

When an angle error of a desktop application is within ±1°, user experience is relatively satisfied.

When an angle error of a mobile terminal application is within ±0.5°, user experience is relatively satisfied.

The support structure 8 is matched with the projector 6, the auxiliary imaging screen 7, and the reflective geometrical holographic screen 11 separately, and provides physical structural support for the projector 6, the auxiliary imaging screen 7, and the reflective geometrical holographic screen 11. Specifically, the support structure 8 may be made into a support frame with a fixed structure. At this time, the display system of the present disclosure is fixed as a whole, and the user needs to be in a specific location to observe the picture.

The controller 9 is electrically connected with the projector 6. The projector 6 may adjust a depth of field and picture content of a projection picture based on a control signal of the controller 9.

Figure 23:
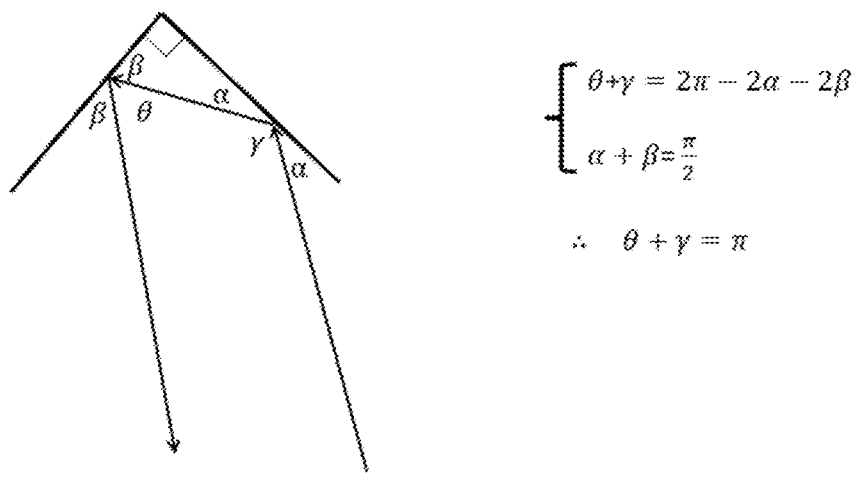
FIG. 23 is schematic diagram of a reflection light path of light on mutually perpendicular surfaces, that is, right-angle reflecting walls according to Embodiment IV of the present disclosure.

Explanation of a principle of retro-reflection: As shown in FIG. 23, when light is irradiated on two reflective walls forming a right angle, after two reflections, outgoing light may propagate in a direction parallel to the incident light. When the right-angle reflective wall is small enough, a distance between the outgoing light and the incident light may be very small. It is too small to be distinguished by the human eye. Thereby, it looks like the light returning along the same path. Certainly, the right-angle reflective wall in a two-dimensional plane may only reflect light in the plane in an original path. If a reflective wall with a right-angle triangular pyramid structure may be formed in space, light in space may be reflected along the same path.

The cross section being the right triangle or the pentagon including a rectangle and a right triangle has a plurality of right-angle reflective walls. For example, right-angle reflective walls formed by two inclined planes of the cylindrical elementary prism 111, and right-angled reflective walls separately formed by the inclined plane and the reflective layer 113 or the end surface of the cylindrical elementary prism 111. Therefore, this micro-structure unit has a function of reflecting light in space along the same path. If many such micro-structures are densely disposed on a plane, incident light of a large area can be reflected along the same way.

Figure 20:
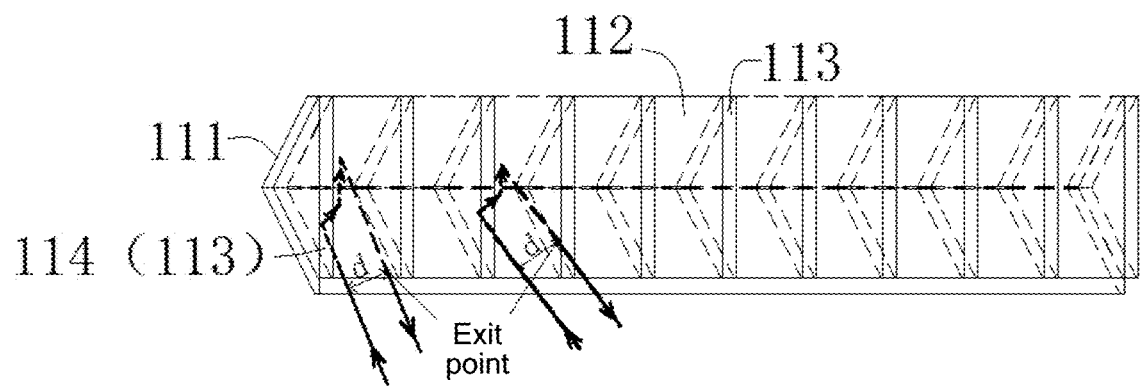
FIG. 20 is a retro-reflection light path diagram of a cylindrical elementary prism retro-reflecting light not parallel to a cross section according to Embodiment IV of the present disclosure.
Figure 21:
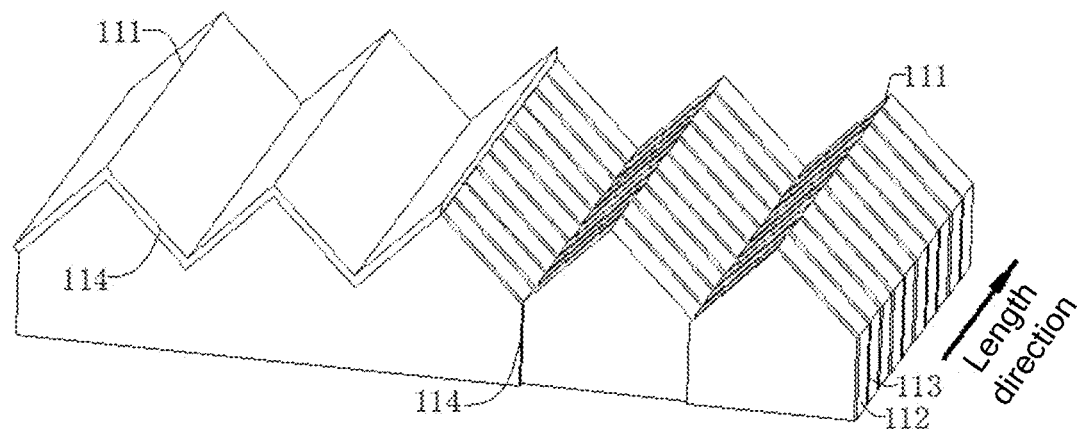
FIG. 21 is a schematic structural diagram of a reflective geometrical holographic screen whose cross section is pentagons, each of which is formed by a rectangle and a right triangle after a part of a reflective film is hidden according to Embodiment IV of the present disclosure.

As shown in FIG. 20, when any light not parallel to the cross section of the cylindrical elementary prism 111 is irradiated from an incident surface onto the reflective layer 113 or the reflective film 114 on the end surface of the cylindrical elementary prism 111, the light undergoes three reflections. The light is reflected to an adjacent inclined plane for a first reflection. The light is reflected to another inclined plane by a second reflection of the reflective film 114 coated on the inclined plane. The light is then reflected for a third reflection by the reflective film 114 coated on the inclined plane. This allows the light to be reflected back parallel to a direction of the incident light after being shifted by d mm. This retro-reflected light can be used for 3D imaging.

Figure 22:
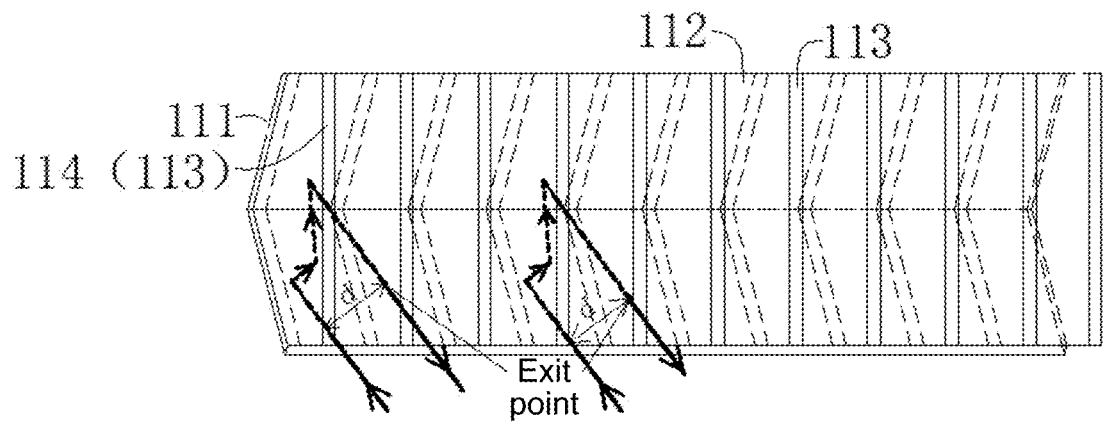
FIG. 22 is a retro-reflection light path diagram included in FIG. 23 of a cylindrical elementary prism retro-reflecting light not parallel to a cross section according to Embodiment IV of the present disclosure.

Similarly, as shown in FIG. 22, when any light not parallel to the cross section of the cylindrical elementary prism 111 is irradiated from an incident surface onto the reflective layer 113 or the reflective film 114 on the end surface of the cylindrical elementary prism 111, the light may also be retro-reflected after a plurality of reflections for 3D imaging.

For incident light parallel to the cross section of the cylindrical elementary prism 111, according to the optical path principle of FIG. 11, 3D imaging can be achieved by retro-reflection of the light after two reflections on two inclined planes.

As a preferred solution, the holographic display system of the present disclosure also includes an interactive motion capturing unit and a human eye tracking unit that are electrically connected to the controller 9. For the interactive motion capturing unit and the human eye tracking unit, correspondingly refer to specific content of the interactive motion capturing unit and the human eye tracking unit in Embodiment II. This is not described in this embodiment.

In order to increase flexibility of the display system, the support structure 8 may also be set as a movable or deformable structure. The support structure 8 and the controller 9 are electrically connected. The support structure 8 makes a corresponding response motion based on control information of the controller 9, so as to achieve relative movement and/or overall movement among the projector 6, the auxiliary imaging screen 7, and the reflective geometrical holographic screen 11. In this way, a visual window of the system always covers a user's eye, so that the user can normally watch the picture in different directions. It should be noted that the support structure 8 is based on a general prior art, and may be designed by those skilled in the art based on a space condition of a practical application. For example, using some hinge structures and structures similar to umbrella shafts, it is very easy to design the deformable structure. This is not specifically limited herein.

Figure 17:
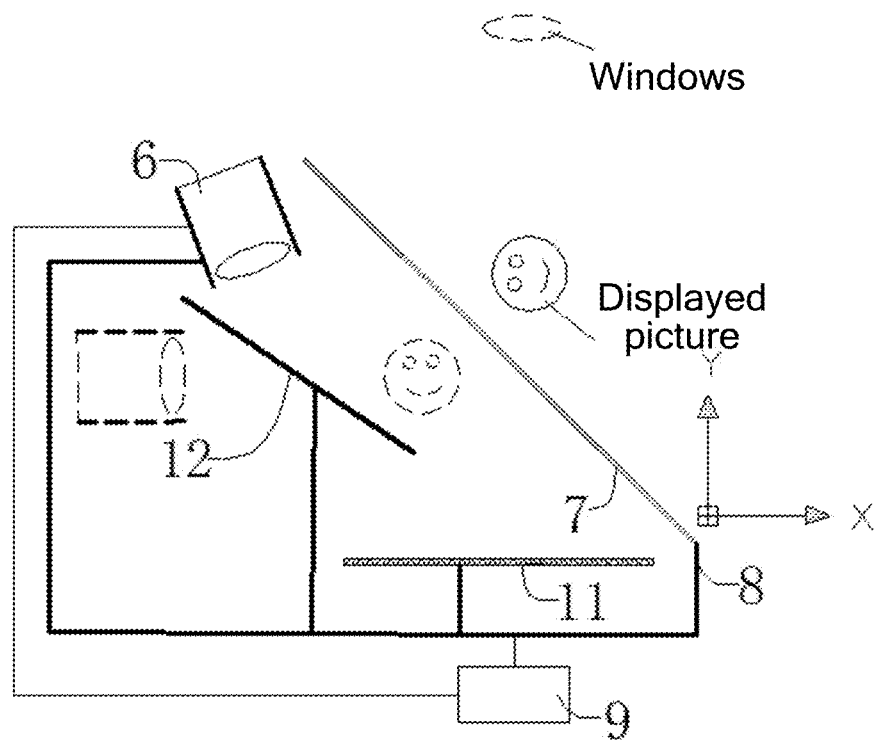
FIG. 17 is a schematic diagram of a system of the present disclosure in which an optical path folding mirror group is added on a same side of the projector on a basis of FIG. 14 according to Embodiment IV of the present disclosure.
Figure 18:
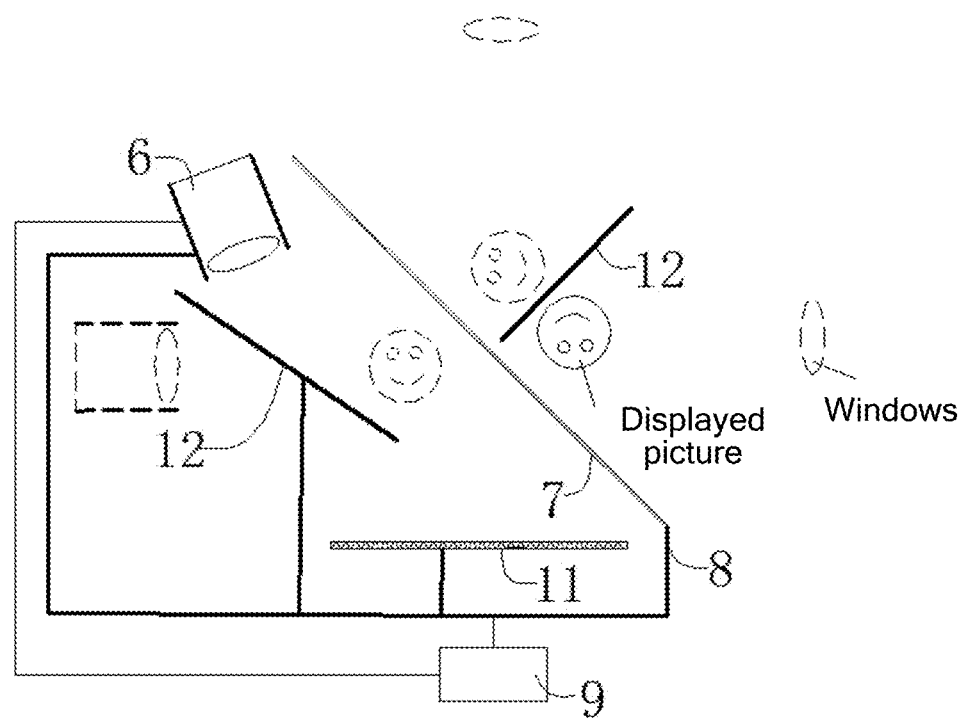
FIG. 18 is a schematic diagram of a system of the present disclosure in which one optical path folding mirror group is added on another side of the auxiliary imaging screen on a basis of FIG. 17 according to Embodiment IV of the present disclosure.
Figure 19:
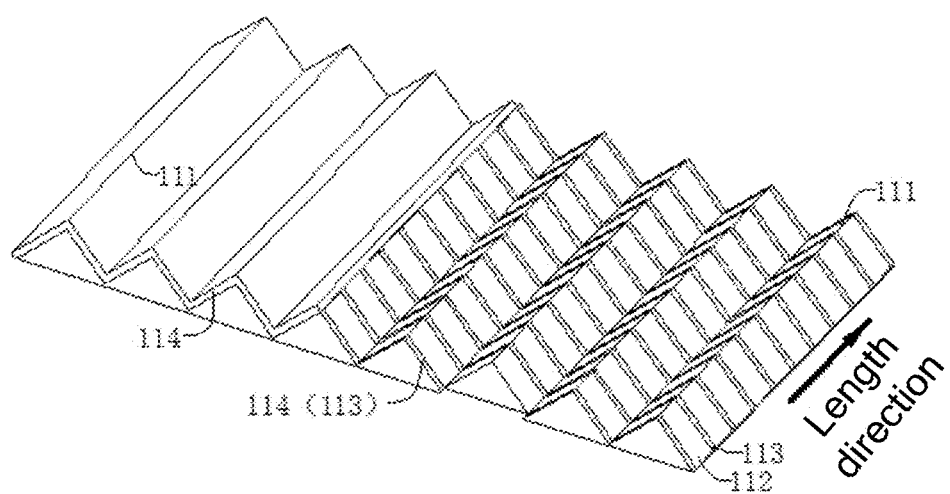
FIG. 19 is a schematic structural diagram of a reflective geometrical holographic screen whose cross section is right triangles after a part of a reflective film is hidden according to Embodiment IV of the present disclosure.

As shown in FIG. 17 and FIG. 18, in order to further improve the flexibility of the system, an optical path folding mirror group 12 may further be disposed on one side or both sides of the auxiliary imaging screen 7. The optical path folding mirror group 12 includes at least one mirror, so as to adjust an imaging optical path to adapt to various application space scenarios. For the holographic display system including the optical path folding mirror group 12, the support structure 9 may also simultaneously control the projector 6, the auxiliary imaging screen 7, the reflective geometrical holographic screen 11, and the optical path folding mirror group 12 to perform relative or overall movement, thereby performing real-time adjustment, to ensure that the user can watch normally.

Similarly, when an ordinary projector is used as a projector, a specific focusing process may refer to the relevant content in Embodiment II. This is not described in this embodiment.

One projector 6 is taken as an example for description in the present disclosure.

Figure 14:
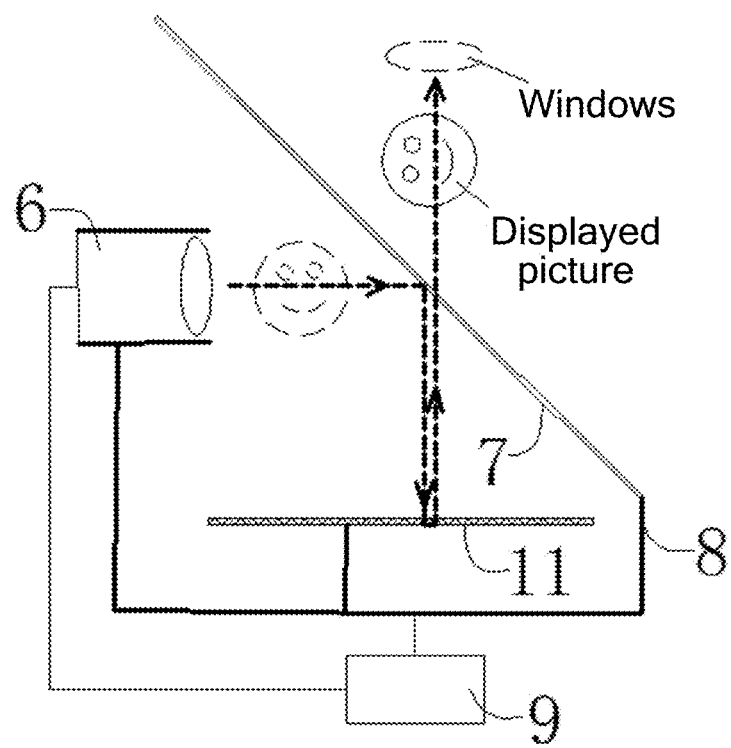
FIG. 14 is a schematic diagram of a system and an optical path diagram of the present disclosure in which a projector and one reflective geometrical holographic screen are located on a same side of an auxiliary imaging screen according to Embodiment IV of the present disclosure.

As shown in FIG. 14, the projector 6 and one reflective geometrical holographic screen 11 are located on a same side of the auxiliary imaging screen 7. Projected light of the projector 6 is partially irradiated on the reflective geometrical holographic screen 11 through light splitting of the auxiliary imaging screen 7. After the light is retro-reflected by the reflective geometrical holographic screen 11, the light is reflected back in a same direction and passes through the auxiliary imaging screen 7, forming an off-screen displayed picture on another side of the auxiliary imaging screen 7. The displayed picture may be seen by a human eye through a window as shown in the figure.

Figure 15:
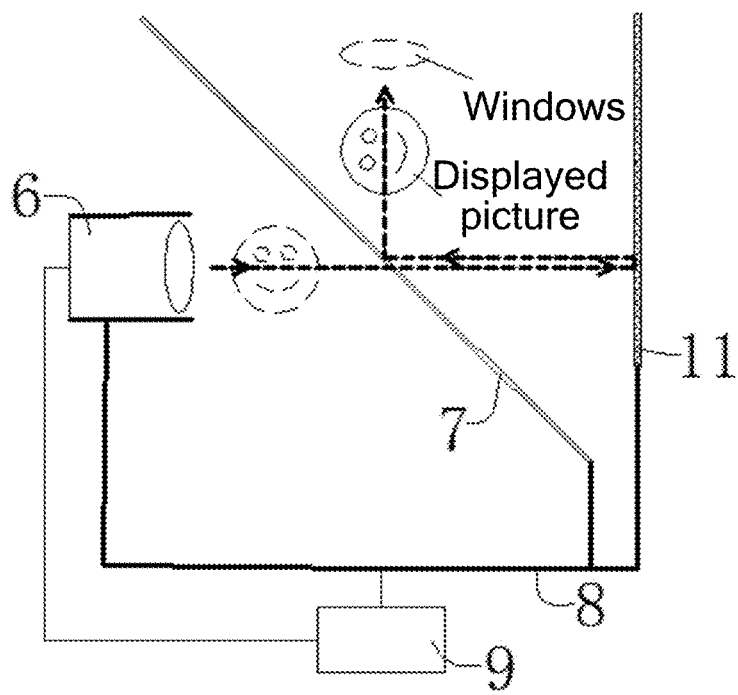
FIG. 15 is a schematic diagram of a system and an optical path diagram of the present disclosure in which the projector and one reflective geometrical holographic screen are separately located on both sides of the auxiliary imaging screen according to Embodiment IV of the present disclosure.

As shown in FIG. 15, the projector 6 and one reflective geometrical holographic screen 11 are located on both sides of the auxiliary imaging screen 7 separately. Projected light of the projector 6 is partially irradiated on the reflective geometrical holographic screen 11 passing through the auxiliary imaging screen 7. After the light is retro-reflected by the reflective geometrical holographic screen 11, the light is reflected back in a same direction through light splitting of the auxiliary imaging screen 7, forming an off-screen displayed picture in the space. The displayed picture may be seen by a human eye through a window as shown in the figure.

Figure 16:
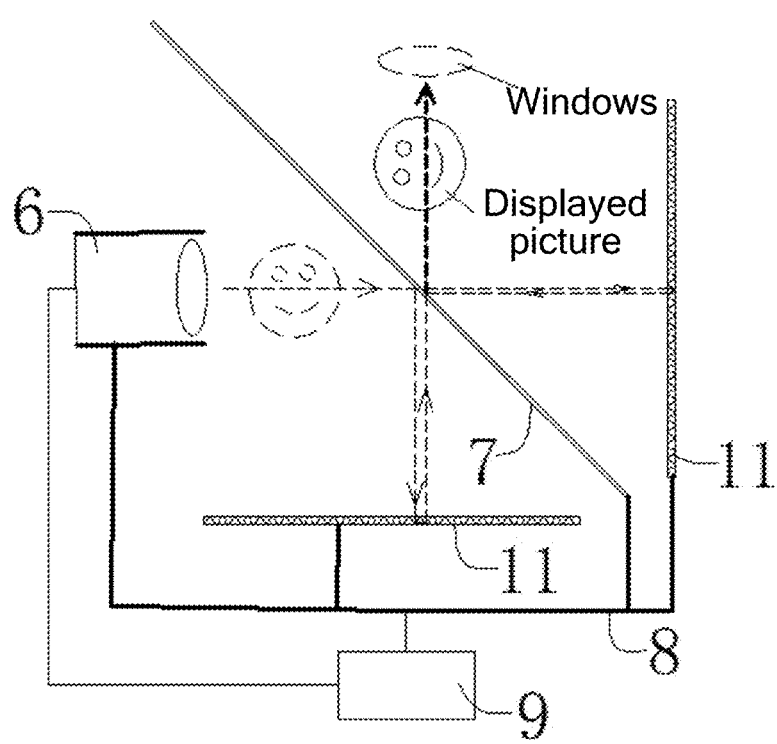
FIG. 16 is a schematic diagram of a system and an optical path diagram of the present disclosure in which two reflective geometrical holographic screens are separately located on both sides of the auxiliary imaging screen according to Embodiment IV of the present disclosure.

It is easy to find from an optical path principle in FIG. 14 and FIG. 15 that when the auxiliary imaging screen 7 is a transflective film, an energy utilization rate of light is only ¼. In order to improve a utilization rate of light energy, some special optical designs may be used, such as a solution of polarization+wave plate. This can greatly improve the utilization rate of light energy. A specific design scheme is the general knowledge in the field. Details are not repeatedly described herein. In addition, as shown in FIG. 16, a solution of two reflective geometrical holographic screens 11 may also be adopted. In other words, two reflective geometrical holographic screens 11 are separately disposed on both sides of the auxiliary imaging screen 7. This can effectively improve (double) light energy utilization and improve imaging quality of the system.

It should be noted that the above is only an illustration of the present disclosure, not a limitation of the present disclosure. The present disclosure is also applicable to a plurality of projectors 6.

Compared with a conventional display system, the reflective geometrical holographic display system of the present disclosure is very special. The reflective geometrical holographic display system cannot be viewed by a large quantity of users simultaneously like a conventional 2D display device. For convenience of expression, a concept of viewpoint is also introduced herein. Specifically, refer to the illustration of the viewpoint in Embodiment II. This is not described in this embodiment.

In this embodiment, an effect of a corresponding display system is illustrated by using an example in which the projector 6 in the display system is an ordinary projector, and the reflective geometrical holographic screen 11 and the projector 6 are located on a same side of auxiliary imaging screen 7. It should be noted that, when same parameters are used, data parameters of Example 1 to Example 27 may all refer to the table in Embodiment II. This is not described in this embodiment. Further, for an obtained effect conclusion is the same, this is not described in this embodiment.

The display principle of the embodiment of the present disclosure is as follows: The projector 6 may project pictures at different depths in space. In other words, additional depth-of-field information may be provided for a projection picture. However, the picture projected by the projector 6 is with divergent light, and cannot be directly viewed by the human eye. This is why a conventional projection system must use a receiving screen. On the other hand, the reflective geometrical holographic screen 11 of the present disclosure has a function of retro-reflecting irradiated light thereon along the same way. The auxiliary imaging screen 7 is a transflective film with a spectral function. In this way, after light emitted by the projector 6 is irradiated on the auxiliary imaging screen 7, the light is partially reflected on the reflective geometrical holographic screen 11. Due to the retro-reflection function of the reflective geometrical holographic screen 11, the light may return along the same way (or along an approximate way). The returned light passes through the auxiliary imaging screen 7 again. The light partially passes through the auxiliary imaging screen 7, so as to form a converged off-screen projection picture in the air. At this time, if the human eye is at a mirror location of the projector 6 relative to the auxiliary imaging screen, the image can be observed. (Only in a small region of the mirror location of the projector relative to the auxiliary imaging screen, the human eye can normally see a complete projection picture.)

From analysis of the display principle of the present disclosure, it can be found that when the projector 6 is used, the picture seen by the user is exactly the same as the picture projected by the projector 6. A distance between the picture projected by the projector 6 and the outermost lens of the projector 6 is the same as that between the picture seen by the user and the eye. In life, a visual distance of the human eye is generally 25 cm, and a closest object is generally 10 cm away from the human eye. Therefore, when a projector 6 is chosen, a projector (ordinary projector or holographic projector) whose projection depth of focus may be adjusted in a space greater than 0.1 m from an outer surface of an outermost lens of a projection lens (such as FIG. 6) is preferred.

Figure 24:
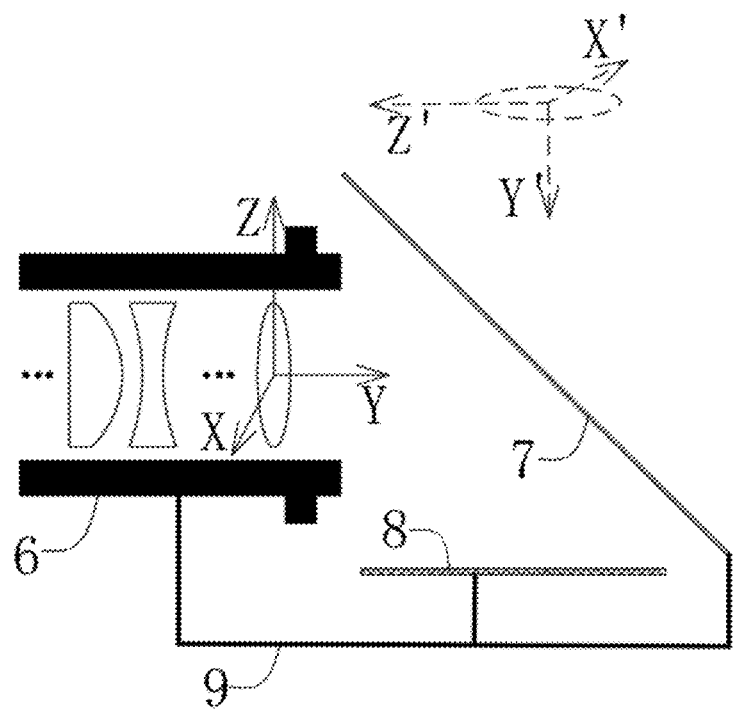
FIG. 24 is a schematic diagram of a coordinate system (X', Y', Z') in which an ellipsoid visible space is located according to Embodiment IV of the present disclosure.

Different from Embodiment II, an ellipsoid region in this embodiment is specifically shown in FIG. 24. A center of an outermost lens of each projector 6 is taken as an origin. An outer normal of a lens center is taken as a Y-axis direction. A line passing through the origin and perpendicular to a horizontal plane is taken as an X axis. A line passing through the origin and perpendicular to the X and Y axes is taken as a Z axis. This forms a coordinate system (X, Y, Z). An ellipsoid visible space is a space satisfying the following relational expression under an optical conjugate coordinate system (X', Y', Z') obtained after optical conversion of the coordinate system (X, Y, Z):

$$\frac{y'^2}{m \cdot D^2} + \frac{x'^2 + z'^2}{(D+K)^2} \leq 1,$$

where K is an expansion constant in decimeters, and a range of K is 0<K<0.08; and m is a conjugate deviation constant, and a range of m is 0≤m≤5.

For other content, refer to the description in Embodiment II.

Compared with the prior art, Embodiment IV of the present disclosure has the following advantages:
1. The reflective geometrical holographic screen that can modulate light at any angle to achieve retro-reflection is introduced, to modulate the incident light. This saves another optical module, reduces costs to a certain extent, and reduces a space occupied by the system.
2. Two reflective geometrical holographic screens are adopted in the display system of the present disclosure, and are separately disposed on both sides of the auxiliary imaging screen. There is no interference from non-imaging light during imaging. This greatly improves the imaging quality, and the light source utilization rate is high.
3. The support structure is set as the deformable or moving structure, so as to achieve the relative movement and/or the overall movement among the projector, the auxiliary imaging screen, and the reflective geometrical holographic screen. Therefore, dynamic display is achieved.
4. The reasonable optical parameter setting can effectively improve the display effect and reliability of the holographic display system.

Various simple evolutions can also be carried out in the embodiments of the present disclosure. For example, a polarizing film, a ¼ glass slide, an anti-reflective film, a light-absorbing film, and another optical element may be added/used to further improve the utilization rate of light and the display effect. The various evolutions are within the protection scope of the present disclosure.

It should be noted that, the embodiments of the present specification are described herein in a progressive manner. Each embodiment focuses on the difference from another embodiment, and the same and similar parts between the embodiments may refer to each other.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. An on-site holographic display system, comprising a holographic projector (1), a projection screen (2), an interactive response unit (3), and a processor (4), wherein
locations of the holographic projector (1) and the projection screen (2) correspond to each other, and the holographic projector (1) is configured to project a 3D image with depth information in space;
the projection screen (2) is a screen forming a conjugate image point by converging an image point on one side of the projection screen (2) to another side of the projection screen (2), and is configured to convert the 3D image with depth information projected by the holographic projector (1) into a conjugate location of the 3D image;

the holographic projector (1) and/or the projection screen (2) is provided with a motion actuator (5) connected to the processor (4), and the motion actuator (5) is configured to control relative movement and/or overall movement between the holographic projector (1) and the projection screen (2);

a lens diameter of the holographic projector (1) is D, a maximum horizontal length of the projection screen (2) is L, a weight of the holographic projector (1) is W, and D, L, and W satisfy:

$$0 < \frac{D}{L \cdot W} \le 20;$$

the interactive response unit (3) comprises a human eye tracking unit (31) and an interactive motion capturing unit (32) or comprises only the interactive motion capturing unit (32), wherein the human eye tracking unit (31) is configured to track a location of a human eye (E) and send positioning information of the human eye (E) to the processor (4), the interactive motion capturing unit (32) is configured to identify a user interactive motion and send information about the user interactive motion to the processor (4), and the processor (4) controls the system to respond accordingly based on the positioning information of the human eye (E) and/or the information about the user interactive motion; and the processor (4) is electrically connected to the holographic projector (1), the interactive response unit (3), and the motion actuator (5) separately, and the processor (4) sends projection data information to the holographic projector (1), to control a projection picture and a picture depth of the holographic projector (1).

2. The on-site holographic display system according to claim 1, wherein the human eye tracking unit (31) comprises a camera and an infrared distance detector, wherein the camera is configured to recognize a face and position the location of the human eye (E) based on an image recognition technology; and the infrared distance detector is configured to detect a distance between the human eye (E) and the projection screen (2).

3. A transmissive geometrical holographic display system, comprising:

a display element (6), configured to project picture information in space;

a transmissive geometrical holographic screen (7), being a screen forming a conjugate image point by converging an image point on one side of the transmissive geometrical holographic screen (7) to another side of the transmissive geometrical holographic screen (7), with a location corresponding to the display element (6), and configured to convert an image projected by the display element (6) to an optical conjugate location relative to the transmissive geometrical holographic screen (7);

a support structure (8), matched with the display element (6) and the transmissive geometrical holographic screen (7) separately, and providing physical structural support for the display element (6) and the transmissive geometrical holographic screen (7); and a controller (9), electrically connected to the display element (6), wherein the display element (6) comprises at least one ordinary projection device capable of projecting a two-dimensional picture, a quantity of viewpoints of the transmissive geometrical holographic display system is n, an average diameter of transparent parts of an outermost lens of the ordinary projection device comprised in the display element (6) is D decimeters, an average power of projection light sources of the ordinary projection device comprised in the display element (6) is P watts, and n, D, and P satisfy:

$$n^{1.27} \cdot P \cdot \left(1 - \frac{D}{27}\right) \le 630.$$

4. The transmissive geometrical holographic display system according to claim 3, wherein an average display luminous flux of the ordinary projection device comprised in the display element (6) is L lumens, the quantity of viewpoints of the transmissive geometrical holographic display system is n, and L and n satisfy:

$$n^{1.27} \cdot L \le 24000.$$

5. The transmissive geometrical holographic display system according to claim 4, wherein the quantity of viewpoints of the transmissive geometrical holographic display system is n, the average diameter of transparent parts of an outermost lens of the ordinary projection device comprised in the display element (6) is D decimeters, the average display luminous flux of the ordinary projection device comprised in the display element (6) is L lumens, and n, D, and L satisfy:

$$n^{1.27} \cdot L \cdot \left(1 - \frac{D}{27}\right) \le 20883.$$

6. The transmissive geometrical holographic display system according to claim 3, wherein a plurality of ordinary projection devices comprised in the display element (6) can be replaced by a projection device that can display a three-dimensional picture or a group of two-dimensional pictures distributed in different depths of field in space.

7. The transmissive geometrical holographic display system according to claim 3, wherein a projection depth of focus of the display element (6) is adjustable in spaces of 0.1 m and greater than 0.1 m away from an outermost lens of a lens.

8. The transmissive geometrical holographic display system according to claim 3, wherein the support structure (8) is a movable or deformable structure, and is electrically connected to the controller (9), and the controller (9) is capable of controlling the support structure (8) to achieve relative movement and/or overall movement of the display element (6) and the transmissive geometrical holographic screen (7).

9. The transmissive geometrical holographic display system according to claim 8, further comprising a human eye tracking unit (102) electrically connected to the controller (9), wherein the human eye tracking unit (102) is configured to track a location of a human eye and send positioning information of the human eye to the controller (9); and based on the received positioning information of the human eye obtained by the human eye tracking unit (102), the controller (9) controls the support structure (8) to make a corresponding motion response, and adjusts a relative location and/or an overall spatial location of the display element (6) and the transmissive geometrical holographic screen (7), so that the user's eye is always in a visible space of the system.

10. The transmissive geometrical holographic display system according to claim 9, wherein a center of an outermost lens of each projection device of the display element (6) is taken as an origin, an outer normal of a lens center is taken as a Y-axis direction, a line passing through the origin and perpendicular to a horizontal plane is taken as an X axis, and a line passing through the origin and perpendicular to the X and Y axes is taken as a Z axis, to form a coordinate system (X, Y, Z), and the visible space is a space satisfying a following relational expression under an optical conjugate coordinate system (X', Y', Z') of the coordinate system (X, Y, Z) relative to the transmissive geometrical holographic screen (7):

$$\frac{y'^2}{m \cdot D^2} + \frac{x'^2 + z'^2}{(D+K)^2} \leq 1,$$

wherein K is an expansion constant in decimeters, and a range of K is 0<K<0.08; and m is a conjugate deviation constant, and a range of m is 0≤m≤5.

11. The transmissive geometrical holographic display system according to claim 3, further comprising at least one optical path folding mirror group (10) disposed on one side or both sides of the transmissive geometrical holographic screen (7) and connected to the support structure (8) separately, wherein the optical path folding mirror group (10) comprises at least one plane mirror with reflection function, and is configured to change a propagation path of light projected by the display element (6).

12. The transmissive geometrical holographic display system according to claim 11, wherein the support structure (8) is a deformable or movable structure, and is electrically connected to the controller (9), and the controller (9) is capable of controlling the support structure (8) to deform or move, so as to achieve relative movement and/or overall movement among the display element (6), the transmissive geometrical holographic screen (7), and the optical path folding mirror group (10).

13. A reflective geometrical holographic display system, comprising:
- at least one projector (6), configured to project picture information in space;
- an auxiliary imaging screen (7), for light splitting;
- one reflective geometrical holographic screen (11) located on one side of the auxiliary imaging screen (7), or two reflective geometrical holographic screens (11) respectively located on both sides of the auxiliary imaging screen (7);
- a support structure (8), matched with the projector (6), the auxiliary imaging screen (7), and the reflective geometrical holographic screen (11) separately, and providing physical structural support for the projector (6), the auxiliary imaging screen (7), and the reflective geometrical holographic screen (11); and
- a controller (9), electrically connected to the projector (6), wherein a quantity of viewpoints of the reflective geometrical holographic display system is n, an average diameter of transparent parts of an outermost lens of the projector (6) is D decimeters, an average power of projection light sources of the projector (6) is P watts, and n, D, and P satisfy:

$$n^{1.27} \cdot P \cdot \left(1 - \frac{D}{27}\right) \leq 630.$$

14. The reflective geometrical holographic display system according to claim 13, wherein an average display luminous flux of the projector (6) is L lumens, the quantity of viewpoints of the reflective geometrical holographic display system is n, and L and n satisfy:

$$n^{1.27} \cdot L \leq 24000.$$

15. The reflective geometrical holographic display system according to claim 14, wherein the quantity of viewpoints of the reflective geometrical holographic display system is n, the average display luminous flux of the projector (6) is L lumens, the average diameter of transparent parts of an outermost lens of the projector (6) is D decimeters, and n, L, and D satisfy:

$$n^{1.27} \cdot L \cdot \left(1 - \frac{D}{27}\right) \leq 20883.$$

16. The reflective geometrical holographic display system according to claim 13, further comprising at least one optical path folding mirror group (12) disposed on one side or both sides of the auxiliary imaging screen (7) for light path adjustment.

17. The reflective geometrical holographic display system according to claim 13, wherein the projector (6) comprises an ordinary projection device capable of projecting a two-dimensional picture or a holographic projection device capable of projecting a three-dimensional picture or a group of two-dimensional pictures distributed in different depths of field in space.

18. The reflective geometrical holographic display system according to claim 17, wherein a projection depth of focus of the projector (6) is adjustable in spaces of 0.1 m and greater than 0.1 m away from an outermost lens of a lens of the projector (6); and
- the support structure (8) is a deformable or movable structure, and is electrically connected to the controller (9), wherein the controller (9) is capable of controlling the support structure (8) to deform or move, so as to achieve relative movement and/or overall movement among the projector (6), the auxiliary imaging screen (7), and the reflective geometrical holographic screen (11).

19. The reflective geometrical holographic display system according to claim 13, further comprising a human eye tracking unit (102) electrically connected to the controller (9), wherein
- the human eye tracking unit (102) is configured to track a location of a human eye and send positioning information of the human eye to the controller (9); and
- based on the received positioning information of the human eye obtained by the human eye tracking unit (102), the controller (9) controls the support structure (8) to make a corresponding motion response, and adjusts a relative location and/or an overall spatial location of the projector (6), the auxiliary imaging screen (7), and the reflective geometrical holographic screen (11), so that the user's eye is always in a visible space of the system.

20. The reflective geometrical holographic display system according to claim 19, wherein a center of an outermost lens of a lens of the projector (6) is taken as an origin, an outer normal of a lens center is taken as a Y-axis direction, a line passing through the origin and perpendicular to a horizontal plane is taken as an X axis, and a line passing through the origin and perpendicular to the X and Y axes is taken as a Z axis, to form a coordinate system (X, Y, Z), and the visible space is a space satisfying a following relational expression under an optical conjugate coordinate system (X', Y', Z') obtained after a series of optical conversion of the coordinate system (X, Y, Z):

$$\frac{y'^2}{m \cdot D^2} + \frac{x'^2 + z'^2}{(D+K)^2} \leq 1,$$

wherein K is an expansion constant in decimeters, and a range of K is 0<K<0.08; and m is a conjugate deviation constant, and a range of m is 0≤m≤5.

\* \* \* \* \*